US012307485B1

(12) United States Patent
Gaither et al.

(10) Patent No.: US 12,307,485 B1
(45) Date of Patent: May 20, 2025

(54) DIGITAL GREETING CARD SELECTION, DELIVERY, AND COORDINATED ADVERTISING

(71) Applicant: Network in a Box, Inc., Los Angeles, CA (US)

(72) Inventors: Lee Kyle Gaither, Los Angeles, CA (US); Ricardo Springer, Los Angeles, CA (US)

(73) Assignee: Network in a Box, Inc., Los Angeles, CA (US)

( * ) Notice: Subject to any disclaimer, the term of this patent is extended or adjusted under 35 U.S.C. 154(b) by 0 days.

(21) Appl. No.: 18/747,953

(22) Filed: Jun. 19, 2024

(51) Int. Cl.
  *G06Q 30/00* (2023.01)
  *G06Q 30/0251* (2023.01)
  *G05B 19/418* (2006.01)

(52) U.S. Cl.
  CPC .................. *G06Q 30/0255* (2013.01)

(58) Field of Classification Search
  CPC .................................................. G06Q 30/0255
  See application file for complete search history.

(56) References Cited

U.S. PATENT DOCUMENTS

2005/0154675 A1* 7/2005 Johnson, Jr. ......... G06Q 20/042
  705/26.1
2012/0101883 A1* 4/2012 Akhter ............... G06Q 30/0215
  705/14.17
2013/0159445 A1* 6/2013 Zonka ................ G06Q 10/1093
  709/206
2016/0117753 A1* 4/2016 Horvitz .............. G06Q 30/0631
  705/26.7
2023/0342837 A1* 10/2023 Swanson .............. G06Q 20/352

OTHER PUBLICATIONS

"Word of mouth mobile marketing for real world recommendations". IEEE. 2010. (Year: 2010).*
A consumption model for targeted electronic advertising. IEEE. 1995. (Year: 1995).*

* cited by examiner

*Primary Examiner* — Maria V Vanderhorst
(74) *Attorney, Agent, or Firm* — Holland & Hart, LLP

(57) ABSTRACT

Methods, systems, and devices for wireless communication are described. A server (e.g., a card connect server) may provide the opportunity for a user to remotely identify and select digital content (e.g., a digital creative element, such as a digital greeting card, via an app, a website, or the like) for an intended recipient. The card connect server may communicate with an advertising server to identify relevant advertising information regarding the sender, the recipient, or both. The card connect server and the advertising server may coordinate to send a behavior trigger to the sender, the recipient, or both, resulting in a user making additional purchases (e.g., in store, or remotely). Content providers may provide content (e.g., license content such as greeting cards) to the card connect server, instead of providing greeting cards to multiple vendors, or competing with other card providers for better shelf space in any given physical store.

13 Claims, 9 Drawing Sheets

DIGITAL GREETING CARD SELECTION, DELIVERY, AND COORDINATED ADVERTISING

FIELD OF TECHNOLOGY

The present disclosure relates generally to digital content delivery, and more specifically to digital creative element (e.g., digital greeting card) selection, delivery, and coordinated advertising.

BACKGROUND

Content such as greeting cards may be sold in physical stores. Vendors may purchase greeting cards from the card providers for display and resale, or content providers may pay for shelf space at physical locations of the vendor to more effectively market the greeting cards to users. However, to improve the reach of card providers, each card provider may provide greeting cards to multiple vendors. In such scenarios, card providers that expend capital for shelf space may spend excessively to put greeting cards on shelves at multiple physical stores. Physical stores may spend excessively to gain access to greeting cards from multiple providers, or may give up shelf space for greeting cards, resulting in lost revenue. Vendors may have access to historical purchasing data or other marketing information indicating that purchase of a greeting card may result in predictable purchasing patterns of behavior by users or buyers. For instance, prior to or during a Holiday, a user may be more likely to purchase specific additional items along with a relevant Holiday greeting card. Some content providers may provide electronic or digital content, such as greeting cards. However, without selling greeting cards at a physical location, the vendor may not be able to successfully trigger any user behavior by the user.

SUMMARY

The described techniques relate to improved methods, systems, devices, and apparatuses that support digital creative element selection, delivery, and coordinated advertising. Generally, the described techniques provide for selection and delivery of digital creative elements such as digital greeting cards without requiring physical presence in physical stores, while also supporting behavior triggers (e.g., such as coupons, offers, advertisements, etc.) to both a receiver of the digital content, and a sender of the digital content. For example, as described herein, a server (e.g., a card connect server) may provide the opportunity for a user to remotely identify and select digital content (e.g., a digital creative element, such as a digital greeting card, via an app, a website, or the like) for an intended recipient. The card connect server may communicate with an advertising server to identify relevant advertising information regarding the sender, the recipient, or both. The card connect server and the advertising server may coordinate to send a behavior trigger (e.g., offers, coupons, announcements, discounts, sales, etc.) to the sender, the recipient, or both, resulting in a user making additional purchases (e.g., in store, or remotely). Additionally, or alternatively, content providers (e.g., card providers) may provide content (e.g., license content such as greeting cards) to the card connect server, instead of providing greeting cards to multiple vendors, or competing with other card providers for better shelf space in any given physical store.

A method by an apparatus is described. The method may include receiving, by a first server from a first user device, digital creative element selection information indicating a first digital creative element of a plurality of digital creative elements, the first digital creative element being a first digital greeting card for delivery to a second user device, obtaining, by the first server, user data corresponding to a first user associated with the first user device, a second user associated with the second user device, or both, transmitting, by the first server, the digital creative element selection information and the user data to a second server, receiving, by the first server from the second server, an indication of advertising information for the first user, the second user, or both, the advertising information based at least in part on the digital creative element selection information and the user data, and transmitting, by the first server to the second user device, the first digital greeting card and a first behavior trigger for the second user, the first behavior trigger based at least in part on the advertising information.

An apparatus is described. The apparatus may include one or more memories storing processor executable code, and one or more processors coupled with the one or more memories. The one or more processors may individually or collectively be operable to execute the code to cause the apparatus to receive, by a first server from a first user device, digital creative element selection information indicating a first digital creative element of a plurality of digital creative elements, the first digital creative element being a first digital greeting card for delivery to a second user device, obtain, by the first server, user data corresponding to a first user associated with the first user device, a second user associated with the second user device, or both, transmit, by the first server, the digital creative element selection information and the user data to a second server, receive, by the first server from the second server, an indication of advertising information for the first user, the second user, or both, the advertising information based at least in part on the digital creative element selection information and the user data, and transmit, by the first server to the second user device, the first digital greeting card and a first behavior trigger for the second user, the first behavior trigger based at least in part on the advertising information.

Another apparatus is described. The apparatus may include means for receiving, by a first server from a first user device, digital creative element selection information indicating a first digital creative element of a plurality of digital creative elements, the first digital creative element being a first digital greeting card for delivery to a second user device, means for obtaining, by the first server, user data corresponding to a first user associated with the first user device, a second user associated with the second user device, or both, means for transmitting, by the first server, the digital creative element selection information and the user data to a second server, means for receiving, by the first server from the second server, an indication of advertising information for the first user, the second user, or both, the advertising information based at least in part on the digital creative element selection information and the user data, and means for transmitting, by the first server to the second user device, the first digital greeting card and a first behavior trigger for the second user, the first behavior trigger based at least in part on the advertising information.

A non-transitory computer-readable medium storing code is described. The code may include instructions executable by one or more processors to receive, by a first server from a first user device, digital creative element selection information indicating a first digital creative element of a plurality of digital creative elements, the first digital creative element being a first digital greeting card for delivery to a second user device, obtain, by the first server, user data corresponding to a first user associated with the first user device, a second user associated with the second user device, or both, transmit, by the first server, the digital creative element selection information and the user data to a second server, receive, by the first server from the second server, an indication of advertising information for the first user, the second user, or both, the advertising information based at least in part on the digital creative element selection information and the user data, and transmit, by the first server to the second user device, the first digital greeting card and a first behavior trigger for the second user, the first behavior trigger based at least in part on the advertising information.

Some examples of the method, apparatuses, and non-transitory computer-readable medium described herein may further include operations, features, means, or instructions for transmitting, by the first server to the first user device, a second behavior trigger for the first user based at least in part on the advertising information.

Some examples of the method, apparatuses, and non-transitory computer-readable medium described herein may further include operations, features, means, or instructions for receiving, by the first server from the second user device, a confirmation message indicating successful receipt by the second user device of the first digital greeting card and the first behavior trigger.

In some examples of the method, apparatuses, and non-transitory computer-readable medium described herein, forwarding, by the first server to the first user device, the confirmation message.

In some examples of the method, apparatuses, and non-transitory computer-readable medium described herein, the user data comprises user preferences corresponding to one or more applications supported by the first user device, product preference information corresponding to the one or more applications, purchasing history via the one or more applications, or any combination thereof.

Some examples of the method, apparatuses, and non-transitory computer-readable medium described herein may further include operations, features, means, or instructions for obtaining the user data comprising the user preferences, the product preference information, the purchasing history, or any combination thereof based at least in part on an authorization for the first server associated with the one or more applications supported by the first user device.

In some examples of the method, apparatuses, and non-transitory computer-readable medium described herein, operations, features, means, or instructions for obtaining the user data may include operations, features, means, or instructions for obtaining cookies from one or more websites, keystroke information input via the first user device, demographic inferences corresponding to the first digital greeting card, one or more current conditions associated with selection of the first digital greeting card, or any combination thereof.

In some examples of the method, apparatuses, and non-transitory computer-readable medium described herein, the first behavior trigger, a second behavior trigger for the first user, or both comprise a coupon, an offer for purchase, a temporary discount, an announcement of a product, or any combination thereof.

In some examples of the method, apparatuses, and non-transitory computer-readable medium described herein, the first behavior trigger comprises a selectable link embedded in the first digital greeting card or a digital visual data trigger that may be configured to provide access to the advertising information by the second user device or by a third user device based at least in part on the first digital greeting card being transmitted to the second user device.

In some examples of the method, apparatuses, and non-transitory computer-readable medium described herein, a first message includes both the first digital greeting card and the first behavior trigger.

In some examples of the method, apparatuses, and non-transitory computer-readable medium described herein, a first message includes the first digital greeting card and a second message includes the first behavior trigger.

In some examples of the method, apparatuses, and non-transitory computer-readable medium described herein, the user data corresponding to the second user comprises one or more conditions corresponding to the first digital greeting card, a device identifier corresponding to the second user device, contents of the first digital greeting card, demographic information corresponding to the first digital greeting card, registration information corresponding to an application or operating system at the second user device, or any combination thereof.

DETAILED DESCRIPTION

Figure 1:
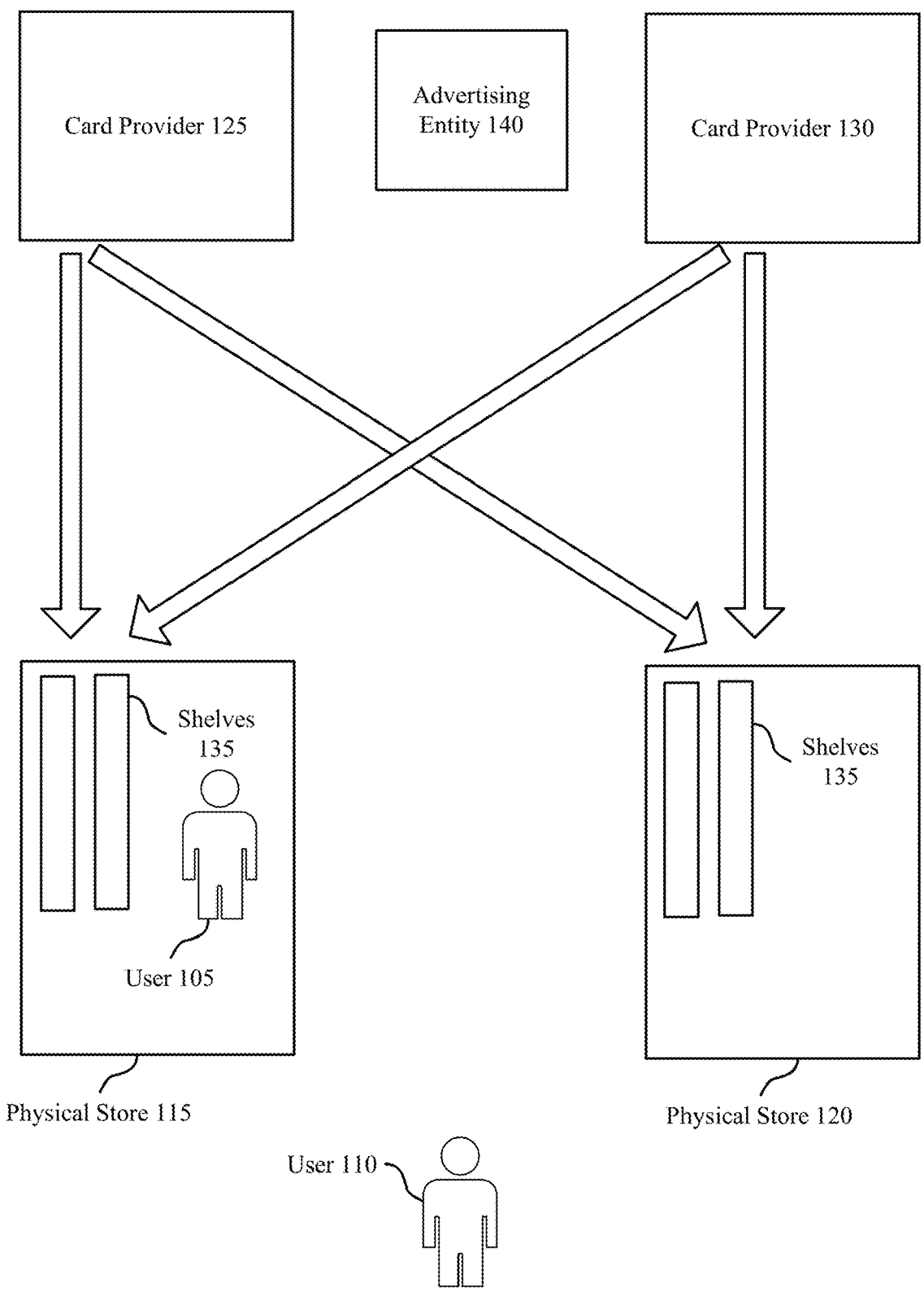
FIG. 1 shows an example of a content and advertising environment that supports digital creative element selection, delivery, and coordinated advertising in accordance with aspects of the present disclosure.

Digital content, such as greeting cards, may be sold in physical stores. Vendors may purchase greeting cards from the card providers for display and resale, or card providers may pay for shelf space at physical locations of the vendor to more effectively market the greeting cards to users. However, to improve the reach of card providers, each card provider may provide greeting cards to multiple vendors. In such scenarios, card providers that expend capital for shelf space may spend excessively to put greeting cards on shelves at multiple physical stores. In some examples, physical stores may spend excessively to gain access to greeting cards from multiple providers (e.g., such as the card provider 125 and the card provider 130). In some examples, each card provider may compete to achieve shelf space at one or more vendors. In such examples, purchase price of greeting cards by vendors may be driven down, or price point for gaining access to shelf space may be driven up by such competition. Thus, placing cards on shelves at various physical entities may result in lost revenue by one or more card providers.

Additionally, or alternatively, various vendors may reserve shelf space for the physical greeting cards. Vendors may have historical purchasing data or other marketing information indicating that purchase of a greeting card may result in predictable purchasing patterns. Shelf space for greeting cards could be allocated to other products. However, without selling greeting cards, the vendor may not be able to successfully trigger any user behavior by the user. For instance, some card providers may support purchase and deliver of electronic cards (eCards), where a user does not have to purchase physical greeting cards. However, if a user does not enter a physical location of a vender to purchase a greeting card, then the user may not purchase the additional related items, resulting in even more lost revenue to the physical store. Additionally, or alternatively, advertisers may not have access to or ability to provide targeted advertisements to users making in-store purchases, or may not have access to users engaging in digital delivery of eCards.

Techniques described herein support methods for providing digital content (e.g., digital creative elements such as greeting cards) without physical presence in the physical stores, while also providing behavior triggers (e.g., such as coupons, offers, advertisements, etc.) to both the sender and the recipient of the digital content. That is, as described herein, a server (e.g., which may be referred to as a card connect server) may provide the opportunity for a sending user to remotely identify and select a digital creative element such as a greeting card (e.g., via an app, a website, or the like) for an intended recipient. The card connect server may communicate with an advertising server to identify relevant advertising information regarding the sender, the recipient, or both. The card connect server and the advertising server may coordinate to send a behavior trigger (e.g., offers, coupons, announcements, discounts, sales, etc.) to the sender, resulting in the sender making additional purchases (e.g., in store, or remotely). This may allow for the physical store to increase revenue, decrease costs, or both, by displaying and selling other goods (e.g., instead of greeting cards) on the shelves while still benefiting from triggered purchasing behavior by the sender. Additionally, or alternatively, the card providers may provide cards (e.g., license content) to the card connect server—e.g., instead of providing digital creative elements (e.g., greeting cards) to multiple vendors, or competing with other card providers for better shelf space in any given physical store. Additionally, or alternatively, techniques described herein support a mechanism to provide advertising content to the recipient of a greeting card. For example, an advertising entity may provide advertising information or a behavior trigger to the recipient of the greeting card (e.g., along with, embedded in, or otherwise included with the greeting card selected by the sender). Thus, in response to the behavior triggers provided to the sender, the receiver, or both, the sender, the receiver, or both may make additional purchases (e.g., remotely or in person) at one or more physical stores.

Aspects of the disclosure are initially described in the context of a wireless communications. Aspects of the disclosure are further illustrated by and described with reference to content and advertising environments and process flows. Aspects of the disclosure are further illustrated by and described with reference to apparatus diagrams, system diagrams, and flowcharts that relate to digital creative element selection, delivery, and coordinated advertising.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented as described with reference to FIGS. 1-3 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIG. 1 shows an example of a content and advertising environment 100 that supports digital creative element selection, delivery, and coordinated advertising in accordance with aspects of the present disclosure.

In some examples of a sales environment, one or more card providers may provide greeting cards to one or more vendors. Greeting cards, as described herein, may refer to any format and packaging of a message which can be standardized or individualized for conveying greetings or other sentiments to other individuals or entities. Greeting cards may include any form of greeting for holidays, special events, may be provided for condolences, humor, congratulations, celebrations, etc. Greeting cards can be standardized (e.g., purchased and provided to an intended recipient without modification), or personalized (e.g., purchased and then modified for the intended recipient or to included personalized information from the giver), or both.

Greeting cards may be sold in physical stores, such as the physical store 115 and the physical store 120. Vendors may purchase greeting cards from the card providers (e.g., the card provider 125 and the card provider 130) for display and resale, or card providers 125 may pay for shelf space at physical locations of the vendor to more effectively market the greeting cards to users. However, to improve the reach of card providers, each card provider may provide greeting cards to multiple vendors. For example, the card provider 125 may provide greeting cards to the physical store 115, and to the physical store 120, and the card provider 130 may also provide greeting cards to the physical store 115 and the physical store 120. In such scenarios, card providers that expend capital for shelf space may spend excessively to put greeting cards on shelves at multiple physical stores. Or physical stores may spend excessively to gain access to greeting cards from multiple providers (e.g., such as the card provider 125 and the card provider 130). Or each card provider may compete to achieve shelf space at one or more vendors. In such examples, purchase price of greeting cards by vendors may be driven down, or price point for gaining access to shelf space may be driven up by such competition. Thus, placing cards on shelves at various physical entities may result in lost revenue by one or more card providers.

In some examples, each vendor may reserve shelf space (e.g., shelves 135) for the physical greeting cards (e.g., the physical store 115 may reserve shelves 135 for displaying and selling greeting cards purchased, licensed, or otherwise provided by the card provider 125, the card provider 130, or both). Vendors may have historical purchasing data or other marketing information indicating that purchase of a greeting card may result in predictable purchasing patterns. For instance, prior to or during a Holiday, a user 105 may be more likely to purchase specific additional items along with a relevant Holiday greeting card (e.g., on Valentine's Day, a user 105 who purchases a Valentine's Day card may be likely to purchase flowers, chocolates, or the like). Shelf space dedicated to greeting cards may result in additional loss of revenue (e.g., other items could be stocked, displayed, and sold using the shelves 135 at a higher profit, resulting in a loss for the vendor). However, without selling greeting cards, the vendor may not be able to successfully trigger any user behavior by the user 105 (e.g., the physical store 115 may not be able to prepare and sell additional related items). That is, if the user 105 does not enter the physical store 115 to purchase a greeting card, then the user 105 may not purchase the additional related items, resulting in even more lost revenue to the physical store 115.

In some examples, the card providers (e.g., the card provider 125 and the card provider 130, among other entities) may generate digital creative elements, such as electronic cards (ecards) for purchase. Greeting cards can be provided for direct sale (e.g., via a website, or an application, among other examples), and may therefore not have to be provided to multiple vendors to reach users. However, vendors such as physical store 115 and the physical store 120 may not be able to sell the related items, and may therefore opt for physical greeting cards on shelves 135. Further, advertisers (e.g., such as the advertising entity 140) may not have access to historical purchasing data (e.g., mass data, statistics, demographic data, individual user history, etc.), and may therefore not be able to effectively advertise regarding ecards, etc. Additionally, or alternatively, although an advertising entity 140 may be able to effectively advertise to a user 105 in a physical store (e.g., advertisements, or offers, may be provided on shelving end caps in the physical store 115, which may be related to relevant holidays or current specials relevant to the user 105), the advertising entity 140 may have no access to the user 110. That is, the user 105 may be present in the physical store 115 and may purchase a greeting card for a user 110 (e.g., who may not be present in the physical store). The advertising entity 140 may provide offers, coupons, or other advertising information to the user 105 (e.g., which may be targeted based on time of year, conditions, demographics, etc.). However, the advertising entity 140 may not be able to provide such advertising information to the user 110, who is the intended recipient of the greeting card.

Techniques described herein support methods for providing greeting cards without physical presence in the physical stores, while also provide behavior triggers (e.g., such as coupons, offers, advertisements, etc.) to both the user 105 and the user 110. That is, as described herein, a server (e.g., a card connect server) may provide the opportunity for a user 105 to remotely identify and select a greeting card (e.g., via an app, a website, or the like) for an intended recipient (e.g., the user 110). The card connect server may communicate with an advertising server to identify relevant advertising information regarding the user 105, the user 110, or both, as described in greater detail with reference to FIGS. 2-3. The card connect server and the advertising server may coordinate to send a behavior trigger (e.g., offers, coupons, announcements, discounts, sales, etc.) to the user 105, resulting in the user 105 making additional purchases (e.g., in store, or remotely). This may allow for the physical store 115 to increase revenue, decrease costs, or both, by displaying and selling other goods (e.g., instead of greeting cards) on the shelves 135. Additionally, or alternatively, the card providers 125 may provide cards (e.g., license content) to the card connect server, instead of provide greeting cards to multiple vendors, or competing with other card providers for better shelf space in any given physical store. Additionally, or alternatively, techniques described herein support a mechanism to provide advertising content to the user 110. For example, as described in greater detail with reference to FIGS. 2-3, the advertising entity 140 may provide advertising information or a behavior trigger to the user 110 (e.g., along with, embedded in, or otherwise included with the greeting card selected by the user 105). Thus, the user 110 may also make additional purchases (e.g., remotely or in person) at one or more physical stores.

Techniques described herein therefore result in more efficient, and more rapid and effective advertising by one or more advertising entities (e.g., which may include the physical store 115, the physical store 120, or any other advertising entity 140), decreases costs and increases revenue for card or communication providers (e.g., such as the card provider 125 and the card provider 130), increased shelf spaces at physical stores, increased revenue and decreased cost for vendors, improved efficiency, convenience, and access to more digital creative elements (e.g., such as greeting cards) by users 105. Techniques described herein further provide a mechanism for advertising to the user 110, improved user experience, and may support a more efficient manner of providing digital creative elements and relevant behavior triggers for users via wireless or wired signaling, as described in greater detail with reference to FIGS. 2-3.

Figure 2:
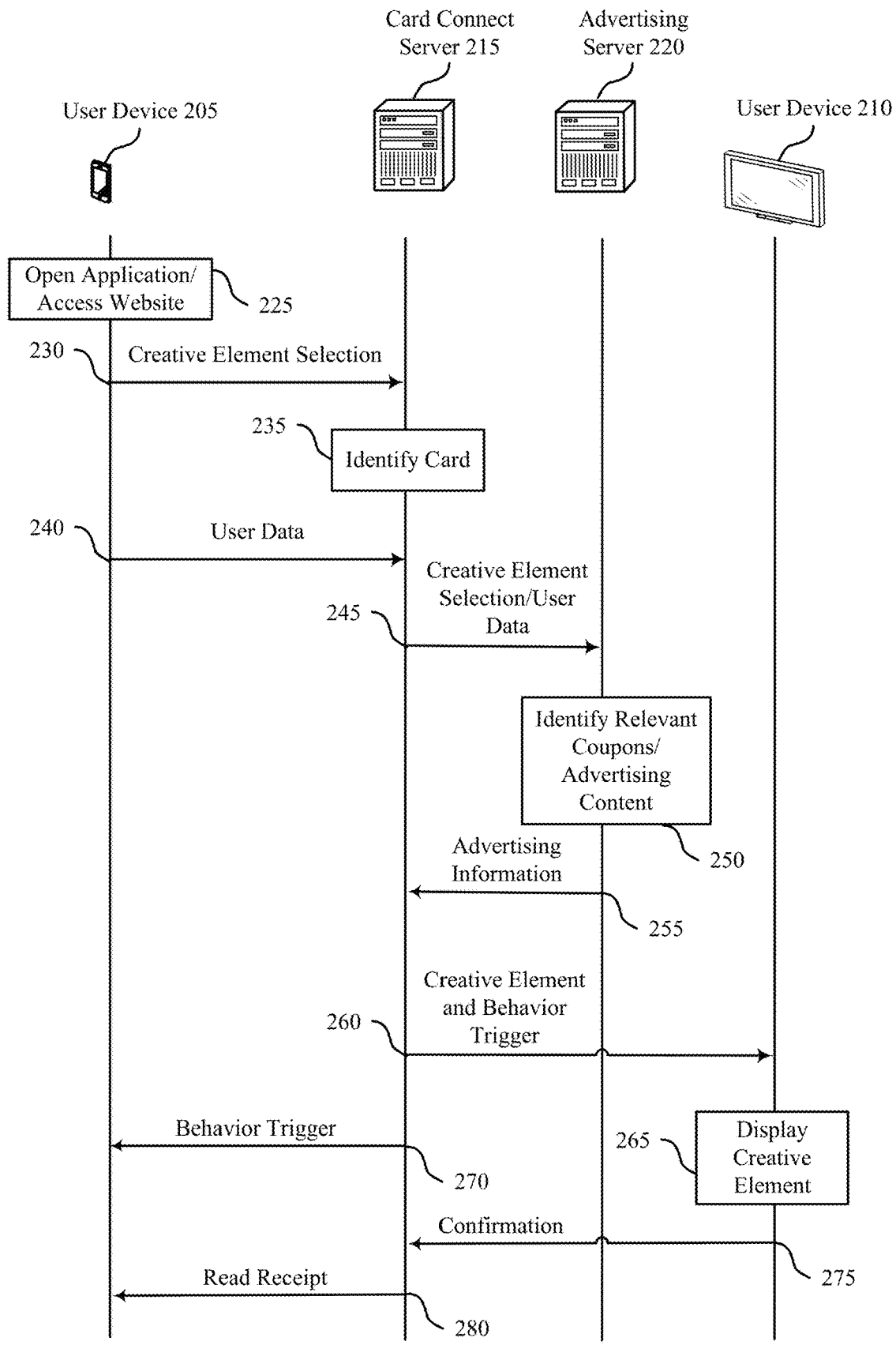
FIG. 2 shows an example of a process flow that supports digital creative element selection, delivery, and coordinated advertising in accordance with aspects of the present disclosure.

FIG. 2 shows an example of a process flow 200 that supports digital creative element selection, delivery, and coordinated advertising in accordance with aspects of the present disclosure. The process flow 200 may implement aspects of, or be implemented by aspects of, FIGS. 2-3. For example, the process flow 200 may include one or more user devices (e.g., the user device 205 and the user device 210) and one or more servers (e.g., the card connect server 215 and the advertising server 220), which may be examples of corresponding devices described with reference to FIGS. 1-3. The various steps and elements of the process flow 200 may be implemented in any order, steps described with reference to the process flow 200 may be omitted, or additional steps may be performed.

The user devices may represent various devices which may communicate (e.g., wirelessly, via a network, via the internet, among other examples, or via wired communications) with one or more of the servers. The user devices may communicate with each other or with one or more servers, or the servers may communicate with each other, via wired or wireless communications. Such wired or wireless communications may include, for example, communications via a coaxial cable, fiber optic cable, twisted pair, digital subscriber line (DSL), backhaul link, or wireless technologies such as infrared, radio, and microwave. Such wireless communications may be supported by one or more radio access technologies (RATs). In some examples, the user device 205 may represent a device utilized by a first user for sending a greeting card to a second user (e.g., via the second user device 210). The user device 205 may be a personal computer, tablet, cell phone, smart phone, computer, smart television (TV), among other examples, The user device 210 may similarly represent any device utilized by a second user to receive the greeting card sent by the first user (e.g., via the first user device 205). The second user device 210 may be an example of a personal computer, tablet, cell phone, smart phone, computer, smart TV, among other examples. In some examples, the various operations described with reference to the process flow 200 may occur in the same order, or in a different order, than the order described with reference to FIG. 2.

As described herein, a digital creative element may refer to content (e.g., digital content) such as a card, a greeting card, a message, a pre-written, pre-illustrated, pre-recorded, or pre-animated image, video, or recording, a message written or recorded by a user, a combination of selectable content and input content (e.g., a selected template, background, text, video, etc., in combination with written or recorded audio or visual content, among other examples), etc. The digital creative element may refer to any combination of content generated by a user, selected by the user, or both. As described herein, a greeting card or card may refer to such a digital creative element.

As described herein, the card connect server may refer to a server that supports selection and delivery of digital creative elements. The card connect server may also be referred to as a server, a communication server, a content server, a connection server, a serve-based system, a server-grade computer, a server-class computer, or a media platform, among other examples. The server (e.g., the card connect server) may be, include, or be implemented by, a server-based system. The server may host (e.g., store) sets of data (e.g., media), and may make such data available or accessible to client systems, for example, via one or more communication links (e.g., via a network, a web-based interface, a network interface, wired or wireless communications, or any combination thereof, among other examples). For example, the server may make (e.g., or be coupled with a system that makes) the hosted sets of data accessible to client systems via a smartphone application, via a web browser-based application, via a social media network, via a video-hosting service, etc. The server may support searching for, transmission of, or playing of hosted media by users of client systems (e.g., via a web-based interface provided by or otherwise associated with a media platform or with the server). In some examples, techniques described herein with reference to FIG. 2 or FIG. 3 may be performed using one or more entities (e.g., a host platform, program, server, media platform, client, device, website, or application other than the card connect server 215 may perform the actions of the card connect server 215 as described herein).

The user device 205, the card connect server 215, the advertising server 220, and the user device 210 (e.g., among other examples of devices, servers, platforms, programs, etc.) may each be communicatively coupled with a network and thus, via the network, with each other. The network may include any network or communications infrastructure via which the user device 205, the card connect server 215, the advertising server 220, and the user device 210 may exchange data. For example, the network may include any aspects of one or more wired networks (e.g., the Internet) or one or more wireless networks (e.g., cellular networks), public networks, or private networks, among other examples. The user device 205, the card connect server 215, the advertising server 220, and the user device 210 may each be communicatively coupled with the network via one or more communications links, which may be considered part of the network.

In some examples, as described herein, the first user may send a digital creative element (e.g., a greeting card) to the second user. For example, at 225, the user device 205 may open an application (e.g., on a smart phone or smart TV, among other examples), or may access a website (e.g., may open a website on a personal computer, laptop, tablet, smart phone, smart TV, among other examples), such as a website (e.g., which may be referred to as a card connect website) corresponding to the card connect server 215.

At 230, the user device 205 may send digital creative element selection information to the card connect server 215. For example, the first user may view, using the first user device 205, various options for digital creative elements made available to the user device 205 via the card connect server 215. The digital creative elements made available may include various types (e.g., different types of or styles of greeting cards). The digital creative elements may include original content supported by the card connect service 215, as well as content (e.g., additional digital creative elements such as additional cards), such as licensed content and partnered content. For instance, one or more entities may license one or more digital creative elements (e.g., cards) which are supported by the card connect server 215, or one or more partner entities may provide cards supported by the card connect server.

The user may select a digital creative element from available categories, based on browsing, based on a query, etc. In some examples, upon selection of the digital creative element by the user device 205, digital creative element selection information may be transmitted to the card connect server 215. The digital creative element selection information may include an indication that the user has selected a particular digital creative element (e.g., a particular message or card). In some examples, the card connect server 215 may propose one or more digital creative elements for selection by the first user device 205 (e.g., based on contextual information such as a current or pending holiday, previous user selections, or the user data indicated at 230), and the first user device 205 may optionally select one of the proposed digital creative elements based on a prompt provided by the card connect server 215.

The digital creative element selection information may further include destination information for a second user (e.g., the intended recipient of the selected digital creative element). For example, the device 205 may receive an input from the user indicating a method of delivery of the digital creative element, a destination for the digital creative element, a timing for delivery of the digital creative element, or the like. For instance, upon selection of the digital creative element, the user device 205 may prompt a user to input such destination information. The user device 205 may provide, to the card connect server 215, an indication of a recipient email, phone number, device identifier, username (e.g., for users utilizing the card connect application, signed into the card connect website, or opting into card connect features, among other examples), or the like. The card connect server 215 may utilize such destination information to provide the digital creative element to the intended recipient (e.g., at 245). In some examples, the card connect server 215, the advertising server 220, or both, may utilize the destination information to identify relevant coupons or advertising content for the second user (e.g., at 250).

In some examples, the user may add additional information, data, correspondence, etc., to the selected digital creative element. For instance, the user may add additional record an audio message, or a video message, my select from a set of optional texts, or add original text, to a selected digital creative element. The card connect server may provide a prompt to the user device 205, providing the user an option to add such additional content to the selected digital creative element. In some examples, the digital creative element itself (e.g., original cards, licensed cards, or partnered cards, among other examples) may include selectable inputs, which the user may take advantage of to add personal information or messages to the selected digital creative element.

At 235, the card connect server 215 may identify the digital creative element indicated by the user device 205 at 230. The card connect server 215 may also identify information relevant to the selected digital creative element. For example, the card connect server 215 may identify a type of digital creative element, a subject matter of a digital creative element, a relevant holiday corresponding to the card, among other examples (e.g., the card connect server 215 may detect the selected card as a Birthday card, a Mother's day card, a Valentine's day card, a well-wishes card, a bereavement card, among other examples).

At 240, the card connect server 215 may receive user data from the user device 205. The user data may include general user data, and rich user data. General user data may refer to general or generic information corresponding to the first user, the second user or both. General user data may be used to infer, assume, or predict information about the first user, the second user, or both. For example, general user data may include demographic information contextually inferred based on user behavior, digital creative element selection, etc.), demographic information corresponding to the second user and recipient of the selected digital creative element (e.g., demographic information, contextually inferred information, etc.) calendar information (e.g., a current or pending holiday), cookies, or any combination thereof. Rich user data may include specific data corresponding to or associated with the first user, the second user, or both. Rich user data may refer to actual behavior, history, actions, or demographic data associated with the first user, the second user, or both. For example, rich data may include, among other examples, key words corresponding to the user device 205 (e.g., key words utilized by the user device 205 when searching for or selecting the selected digital creative element, or key words utilized by the user device 205 when performing other tasks), user behavior corresponding to current or previous actions taken by the user device 205 (e.g., purchases made, previous selections under similar conditions, etc.), demographic information corresponding to the first user (e.g., demographic information provided by the user via the user device 205, among other examples of user data), application use by the user, destination information for the second user (e.g., email address, registration information for a card connect application or at the card connect server 215), acceptance of the digital creative element, sharing of the digital creative element or other cards, confirmation information from previous digital creative element exchanges, application usage by the first user the second user or both, or any combination thereof, among other examples.

As an illustrative example, the card selection information received by the card connect server 215 may indicate that the user device 205 has selected a Mother's Day card. The user data may indicate that, based on statistical or demographic data, the user's mother is likely over a threshold age (e.g., 50 years old) and the user is likely within a range of ages (e.g., 25-30). Such demographic information may be based on marketing data, may be inferred by user behavior, or may be released by the user via the user device 205, among other examples.

In some examples, the card connect server 215 may access the user data upon the user device 205 opening the application, or upon accessing the website (e.g., at 225). In some examples, the first user may authenticate the card connect app, or the card connect website, or may authenticate the card connect server 215, to continuously or periodically access the user data, in which case the card connect server 215 may have access to (e.g., or may store or cache) the user data for use upon selection of a digital creative element (e.g., at 225). In some examples, one or more partner entities may provide user data (e.g., as authorized by one or more users). For example, a third party entity may be a supermarket. The supermarket may maintain its own application or website, may have members who receive specific perks or information, among other examples. The supermarket app may allow the user (e.g., via the user device 205) to authorize the card connect server 215 to identify user data based on the user behavior in the supermarket app, purchase history (e.g., online or in store), or the like. Such user data may include previous purchases, conditions under which the user has made such purchases (e.g., dates, times, other items in a physical or virtual shopping cart when purchase are made, sales or offers or advertisements provided prior to such purchases, repetitive purchases of a product, etc.).

In some examples, at 245, the card connect server 215 may provide the user data (e.g., as indicated at 240), the digital creative element selection (e.g., as indicated at 230), or both, to the advertising server 220. The card connect server 215 may provide the digital creative element selection information and the user data in separate messages, or in a single message. In some examples, upon receiving the user data 240 from the user device 205 (e.g., upon opening the app or accessing the website), the card connect server 215 may provide the user data to the advertising server 220. In some examples, the card connect server 215 may periodically provide such user data to the advertising server 220. In some examples, upon identifying the digital creative element at 235, the card connect server 215 may provide the selected digital creative element, and the user data, to the advertising server 220 for identifying relevant coupons and advertising content.

At 250, the advertising server 220 may identify relevant coupons, advertising content, or a combination thereof, based on the information received from the card connect server 215. The advertising server 220 may support advertising information, coupons, discounts, offers, etc., provided by various entities. In some examples, the advertising server 220 may receive bids, or suggested advertising content from the various entities. In some examples, a same entity that supports an application that coordinates with the card connect server 215 (e.g., the supermarket) may also provide advertising content supported by the advertising server 220. Coupons and advertising content may include offers, new products, sales information, coupons or discounts for particular products, announcements (e.g., a new product in a line has been released, a new product has been introduced, or an old product has been re-released, among other examples), or any combination thereof.

The relevant coupons or advertising content may be generated according to the identified digital creative element and the user data provided at 245. For example, if the digital creative element indicated at 245 is a Birthday card, the advertising server 220 may generate coupons for birthday candles, baking supplies, decorations, or the like. Additionally, if the user data includes purchase history for the user indicating purchase of a particular type of product (e.g., as an illustrative example, dinosaur related toys purchased around the same time each year), then the advertising server 220 may generate coupons or offers related to a similar product (e.g., additional toys). In another illustrative example, if the card is an anniversary card, then the advertising server 220 may select or generate offers for discounted flowers, or gifts, among other examples.

In some examples, the advertising server 220 may generate advertising information (e.g., the relevant content, coupons, advertising content, etc.) for one or multiple entities. For instance, the advertising server 220 may generate advertising content for the first user device 205 (e.g., for the first user who is sending the digital creative element), for the second user device 210 (e.g., for the second user who is the intended recipient of the digital creative element), or both. The coupons or advertising content for the user device 205 may include proposed purchases or experiences based on the user data, the identified digital creative element, or both. For instance, the advertising server 220 may generate advertising information indicating coupons, discounts, or offers, for candidate purchases that are related to the type of digital creative element indicated at 245, that are related to a combination of the relevant user data and the digital creative element (e.g., an identified correlation between a type of card selected and one or more additional purchases relevant to the card, a current holiday, a current time of year, or one or more additional conditions as described herein), or are relevant to the user data independent of the digital creative element. For example, in some cases, the advertising server 220 may generate an advertisement based on demographic information corresponding to the user device 205 (e.g., may generate a particular advertisement based on the age and gender of the first user), or based on purchase history corresponding to the user device 205 (e.g., may generate a particular advertisement for a preferred brand or product, or a discount on a previously purchased item, or may indicate an item regularly purchased by the first user, among other examples).

Similarly, the advertising server 220 may generate advertising information that is relevant to the second user (e.g., the intended recipient of the digital creative element). The advertising server 220 may generate such information based on an inference from the selected digital creative element, or the user data (e.g., for the first user) received at 245. For instance, as an illustrative example, if the selected card is a Mother's Day card, and the user data indicates that the first user is a male between 20 and 30 years of age, then the advertising server 220 may generate advertising information for a woman between 50 and 60 years of age. In some examples, the advertising server 220 may generate such advertising information based on additional user data provided at 245. For instance, the user data provided at 245, the digital creative element selection information provided at 245, or both, may include information relevant to the second user device 210 or the second user, or both. The user device 205 may provide a target address, email address phone number, device identifier, or username (e.g., sign-in or destination information for the second user if the first user device 205 and the second user device 210 are both users or signed in to the card connect app or a card connect network), among other examples.

The advertising server 220 may infer information about the second user based on such destination information (e.g., an email address), or may have access to additional user data (e.g., purchase history information, etc.) for the second user. For instance, the second user may also have access to an application (e.g., for the supermarket). Upon receiving the destination information for the second user, the advertising server 220 may identify purchase history information from the application, or directly from the card connect server 215 (e.g., if the card connect server 215 has access to or has been provided with the information from a vendor or other entity). The advertising server 220 may then generate advertising information for the second user. For instance, if the digital creative element is a birthday card, the advertising server 220 may generate an offer or a coupon for a meal at a restaurant for the second user. In some examples, the advertising server 220 may identify a purchasing history and a product or offer (e.g., a brand of food, beverage, a clothing line, etc.), and may provide advertising information (e.g., a behavior trigger, which may be referred to as an advertorial behavior trigger) such as a coupon, offer, announcement, or the like for the identified product or offer, which may be included in or with the digital creative element (e.g., at 260).

At 255, the card connect server 215 may send the generated advertising information to the card connect server 215. The advertising information may include the relevant coupons, advertisements, discounts, gift cards, or the like. The advertising information may include advertising content for the user device 205, the user device 210, or both. In some examples, the advertising information may be based on (or may include) rich or general user data. The rich or general user data may be the same user data provided by the card connect server 215, or may include additional rich or general user data corresponding to the first user, the second user, or both.

At 260, the card connect server 215 may send the digital creative element, and one or more behavior triggers (e.g., one or more advertorial behavior triggers, such as coupons or advertising content) or a combination thereof, to the user device 210. The behavior trigger may include advertising content. The behavior trigger may be included in the digital creative element itself, or may be provided additionally and separately from the digital creative element. For example, the behavior trigger may include a banner, link, or digital visual data trigger (QR code), which may be included in the digital creative element itself. A digital visual data trigger may be defined as a visual input (e.g., a unique pattern such as squares, dots, bars, etc.) which when scanned translates into a human-readable data. In some examples, a banner, a link, a digital visual data trigger, or another indication of the advertising content may be provided in an email, text message, or as another type of prompt, as described in greater detail with reference to 265.

At 270, the card connect server 215 may send a behavior trigger to the user device 205. The behavior trigger may include advertising information generated at 250 and provided to the card connect server 215 at 255. The behavior trigger may include an offer, a coupon, a discount, an announcement, an advertisement, among other examples, and may motivate the first user (e.g., upon viewing the advertising content) to take an action (e.g., to purchase a product or service indicated in the advertising content). For example, the behavior trigger may include a banner, link, or digital visual data trigger, or the like. In some examples, a banner, a link, a digital visual data trigger, or another indication of the advertising content may be provided in an email, text message, a notification for an application running on the first user device, or as another type of prompt.

At 265, the user device 210 may display the digital creative element (e.g., the card) for the second user. This may occur automatically (e.g., reception of the selected card may automatically be displayed on a smart TV or smart phone via an application running at the OS layer of the smart TV or smart phone, among other examples). In some examples, the user device 210 may, upon reception of the digital creative element at 260, provide an indication to the second user that the digital creative element has been delivered. For instance, a card connect application may provide a notification to the second user via an interface, which the second user may select to display the digital creative element, or the user device 210 may display a link or digital visual data trigger (e.g., a digital visual data trigger) which may be selected by the second user via the user device 210 to display the digital creative element. In some examples (e.g., if the user device 210 is a smart TV), the digital creative element may automatically display on the smart TV, or a card connect application on the smart TV may provide a notification to the second user, allowing the second user to select and display the digital creative element at their convenience via the smart TV.

In some examples, the second user device 210 may also display or otherwise indicate the behavior trigger indicated at 260 (e.g., one or more coupons, gift cards, offers, etc., as applied by the card connect server 215 at 260). The advertising content provided at 260 may be displayed within or as part of the digital creative element, or may be separately provided to the second user. For example, the advertising content may appear on or around the digital creative element, as a banner, a link, a digital visual data trigger, or the like. In some examples, the advertising content may be separately delivered to the second user (e.g., via a card connect app, via a prompt that appears upon viewing of the digital creative element, via text or email, as an automatically displayed banner, among other examples).

At 275, the card connect server 215 may send a confirmation message (e.g., a read receipt) to the user device 205. The read receipt may indicate, to the user device 205, that the digital creative element was successfully displayed by the user device 210 at 265. In some examples, the confirmation may be based on (or may include) rich or general user data. The rich or general user data may be the same user data provided by the card connect server 215, or may include additional rich or general user data corresponding to the first user, the second user, or both. For instance, acceptance of the digital creative element displayed at 265, usage, viewing, or sharing data related to the displayed digital creative element, accessing data for the behavior trigger (e.g., whether or when the second user accessed the digital creative element, any actions taken in response to the behavior trigger such as making a purchase, viewing an advertisement, going to a website, among other examples), or the like.

At 280, the card connect server 215 may send a confirmation message (e.g., may forward the read receipt message received at 275) to the card connect server 215. The confirmation information may indicate that the digital creative element has been successfully delivered, displayed, viewed, selected, or any combination thereof. In some examples, the confirmation message transmitted at 280 may include, or may be based on, rich or general user data corresponding to the digital creative element delivery, the first user, the second user, or any combination thereof.

The examples described herein do not limit the techniques described herein, nor do the provided illustrative examples encompass all variations and aspects of the described techniques.

In an illustrative example, the first user may select a Valentine's Day card, as indicated at 230. The card connect server 215 may identify the card at 235, and may receive user data for the first user at 240. The user data may include data (e.g., purchase history and marketing data) provided by one or more additional applications (e.g., as authorized by the first user via one or more applications), including a supermarket and a clothing store, among other examples. The card connect server 215 may not have access to any additional information regarding the second user in this illustrative example. However, the card connect server 215, the advertising server 220, or both, may infer that the Valentine's Day card is for another person having similar (e.g., within a threshold range) age as the first user. The card connect server 215, the advertising server 220, or both, may further infer additional marketing information (e.g., relationships between commonly purchased items and a Valentine's Day holiday) about the first user, the second user, or both. The card connect server 215 may send the card selection and user data to the advertising server 220 at 245, and the advertising server 220 may identify relevant coupons and advertising content at 250. For instance, the advertising server 220 may generate a behavior trigger for the first user including a coupon for chocolates and flowers at the supermarket, and an announcement of a new line of women's clothing at the commonly used clothing store (e.g., based on the purchase history of the first user associated with the user device 205, the commonly purchased items, or a combination thereof). The advertising server 220 may also generate advertising content for the second user, which may include the offer for the new line of women's clothing, a coupon for a restaurant, or a coupon for items at another third party vendor based on inferred demographics information. The advertising information may be sent to the card connect server 215 at 255, and the card connect server 215 may send the card and advertising content to the user device 210 at 260, and the behavior trigger to the user device 205 at 270.

In another illustrative example, the user may select a birthday card at 230. The user data provided to the card connect server 215 at 240 may indicate that the first user commonly shops at a local supermarket, as well as purchase history at the supermarket, or cookie information regarding commonly used websites, among other examples. The user data may also include a destination for the card (e.g., an email for the second user, or a device ID for the user device 210), indicative of the second user. The card connect server 215, the advertising server 220, or both, may have access to user data regarding the second user (e.g., via one or more applications used by the second user, such as an application for a retail store to which the advertising server 220 and/or the card connect server 215 have access). At 250, the advertising server 220 may identify relevant coupons and advertising content for the first user and the second user. The advertising information sent at 255 may include a coupon for the first user to the supermarket for celebratory foods and beverages (e.g., a cake from the store's bakery, champagne, a beverage regularly purchased by the first user, etc.). The advertising information sent at 255 may further include a coupon for an item at the retail store for the second user, or an offer for discounted Birthday meal from a local restaurant. The coupon for the supermarket may be provided as a behavior trigger to the first user device 205 at 270, and the coupon for the retail store or the restaurant may be provided to the second user device 210 along with (e.g., or embedded in) the card at 260.

In some examples, an application, element, process, site, website, program, operating system, code (e.g., custom code, engineered code, etc.) or the like may coordinate with the card connect server 215 to provide local or subject-based behavior triggers. For instance, a vacation rental service or property host business entity may maintain property including one or more user devices 205 (e.g., a smart TV located in a rental property, a rental car, a ride share service, etc.). In such examples, the business entity may authorize the card connect server 215 to identify relevant coupons or advertising content to a customer (e.g., a second user) via a single device, or multiple devices. For instance, in a first illustrative example, a user may enter a physical property, and may receive a prompt from their own device (e.g., the user device 205) upon accessing the property, or may log into an application or website on their phone to interface with the property manager or business entity (e.g., at 225). Upon doing so (e.g., or earlier based on reservation by the first user, use behavior, prompting by the advertising server 220, or user data provided by the application and/or the user device 205, among other examples), the card connect server 215 may receive user data from the user device 205 at 240 (e.g., via a network interface). The user data may include any elements described herein. In some examples, the user data may include reservation information for the physical location, location information for the physical property, calendaring information (e.g., information about local events), or the like. The user data may be provided to the advertising server 220 (e.g., via a network interface) at 245. In some examples, the digital creative element selection information may include reservation data or a user preference for the application entered by the user via the user device 205 (e.g., the user device 205 may be prompted to input, or may autonomously input, user preferences such as preferred activities, availability, etc.). The advertising server 220 may identify relevant coupons and advertising content at 250, and provide the advertising information to the card connect server 215 at 255. The advertising content may include offers, coupons, announcements, or advertisements for local events, restaurants, stores, etc. (e.g., for the user, who may or may not be local and may or may not have local knowledge). At 270, the card connect server 215 may provide a behavioral trigger (e.g., an advertorial behavior trigger, which may include the advertising information provided at 255) directly to the user device 205.

Similarly, such techniques may be applied to a local (e.g., provided by or owned by the business entity), such as a smart TV located on a rental property, ride share service, etc. For instance, a smart TV in a rental property may include an application, banner, prompt, or the like, which provides access to the card connect server 215. The user data at 240 may include or be based upon reservation information for the individual staying in or using the rental property, and may be provided (e.g., or authorized) by the business entity, the application, or website. In some examples, the user data may include user behavior (e.g., with or without access to any additional user data or information regarding the first user), such as what channels are being watched via the user device 205, location of the rental property, etc. The card connect server 215 may transmit (e.g., via a network interface) the user data to the advertising server 220, and the advertising information provided by the advertising server 220 at 255 may be provided to the user device 205 at 270. The advertising information may include local offers, coupons, announcements, or advertisements for local events, restaurants, stores, etc. (e.g., for the user, who may or may not be local and may or may not have local knowledge). The advertising information may include offers, coupons, discounts, etc. based on the user behavior via the user device 205 (e.g., advertisements for items indicated by the advertising server 220 based on viewing habits, demographic information, etc.). For instance, if the user views sporting events via the user device 205, then the card connect server may generate advertising information targeted for a male of a particular age (e.g., sporting goods stores, pickup trucks, beverages, etc.).

Similar techniques (e.g., for advertising, communication, or the like) via the card connect server based on user behavior may be supported for any user device 205. For instance, a user device 205 in an owner's home may support similar techniques. For example, the advertising server 220 may generate advertising information for the user of the smart TV based on user data including viewing behavior, availability, ownership information, registration for one or more applications, permissions or security authorization provided by the user via the user device 205, or the like. Such advertising information may be provided to the card connect server 215 (e.g., via a network interface), which may in turn transmit (e.g., wirelessly or via wired connection) the behavior trigger to the user device 205.

In some examples, one or more aspects of the process flow 200 may be activated, or deactivated, for one or more procedures. For example, the card connect server 215 may activate or deactivate communications (e.g., via a network interface) with the advertising server 220. In some examples, one or more entities, applications, websites, programs, operating systems, processes, code, or the like, among other examples, may coordinate with (e.g., be granted access to or may license content on) the card connect server 215. For instance, the user device 205 may download an application or may access a website (e.g., an application or website for content sharing and community involvement, or an application or website for small business support, among other examples). In some examples, the application or website may opt to deactivate one or more functionalities at the card connect server (e.g., or the user accessing the website or application may opt out of some services). In such examples, the card connect server 215 may deactivate forwarding of the card selection user data at 245, reception of advertising information at 255, and inclusion of behavior triggers at 260 and 270. Instead, the card connect server 215 may utilize its coordination and signaling capabilities to receive content (e.g., licensed content, original content, content generated at the user device 205, or any combination thereof, among other examples) from the user device 205, and provide the content to the user device 210.

Techniques described herein may support open loop or closed loop scenarios. In some examples of a closed loop scenario, devices may communication (e.g., and implement techniques described herein) using a same operating system (e.g., the user device 205 and the user device 210 may operate using the same operating system, in which case the network connecting the user device 205, the card connect server 215, the advertising server 220, the user device 210, or any combination thereof, may convey information via the same operating system). In some examples of an open loop scenario, devices mya communicate (e.g., and implement techniques described herein) using different operating systems (e.g., the user device 205 and the user device 210 may operate using different operating system, in which case the network connecting the user device 205, the card connect server 215, the advertising server 220, the user device 210, or any combination thereof, may convey information across the different operating systems).

Figure 3:
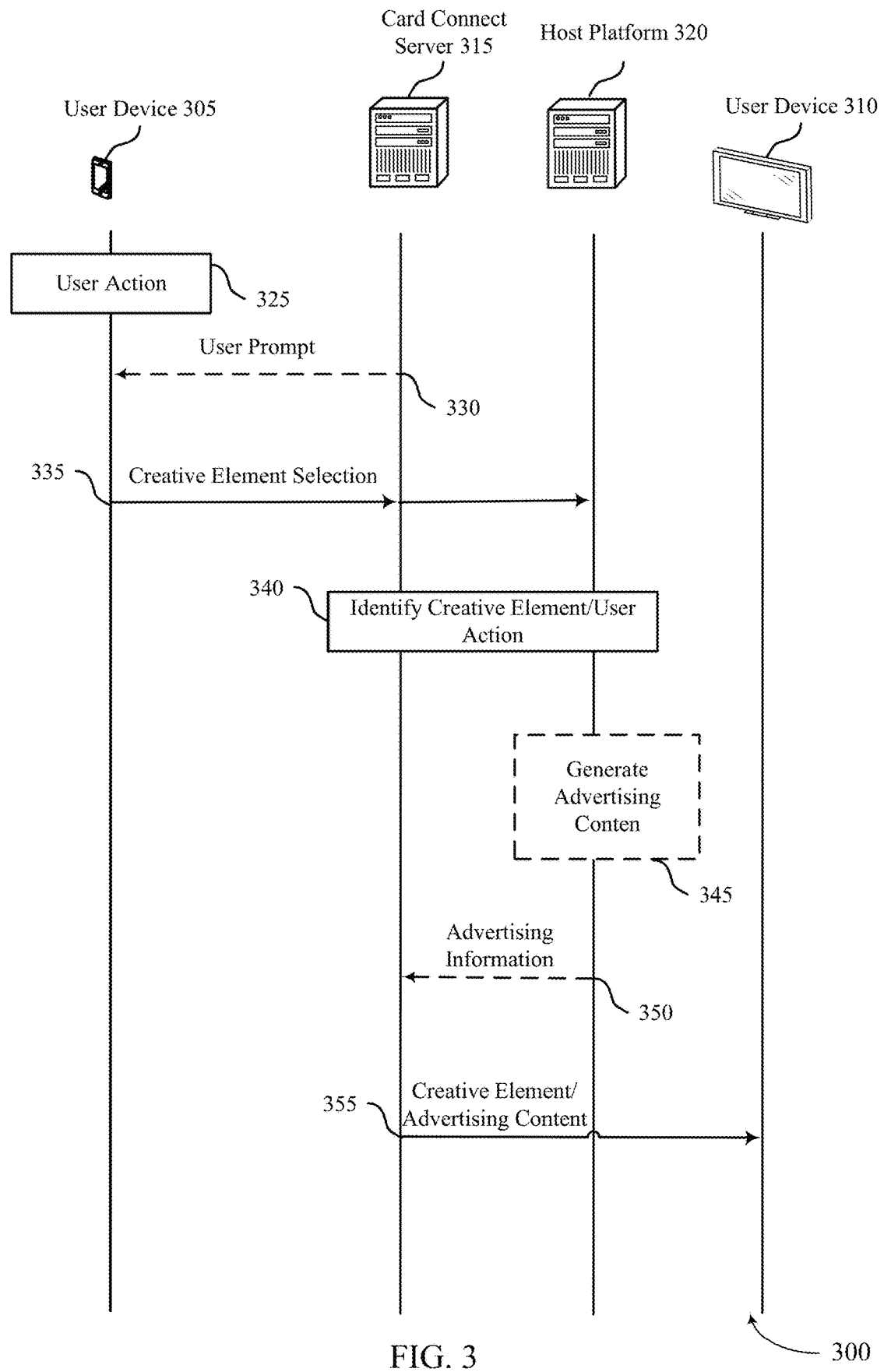
FIG. 3 shows an example of a process flow that supports digital creative element selection, delivery, and coordinated advertising in accordance with aspects of the present disclosure.

FIG. 3 shows an example of a process flow 300 that supports digital creative element selection, delivery, and coordinated advertising in accordance with aspects of the present disclosure. The process flow 300 may implement aspects of, or be implemented by, aspects of FIGS. 1-2. For example, the process flow 200 may include one or more user devices (e.g., the user device 305 and the user device 310) and one or more servers (e.g., the card connect server 315 and the host platform 320, which may be an example of an advertising server, a website, or the like), which may be examples of corresponding devices described with reference to FIGS. 1-2. The various steps and elements of the process flow 300 may be implemented in any order, steps described with reference to the process flow 300 may be omitted, or additional steps may be performed.

The user devices may represent various devices which may communicate (e.g., wirelessly, via wired communications, via a network, via the internet, among other examples) with one or more of the servers, with one or more additional devices, or both. The user devices may communicate with each other or with one or more servers, or the servers may communicate with each other, via wired or wireless communications. Such wired or wireless communications may include, for example, communications via a coaxial cable, fiber optic cable, twisted pair, digital subscriber line (DSL), backhaul link, or wireless technologies such as infrared, radio, and microwave. Such wireless communications may be supported by one or more radio access technologies (RATs). For instance, the user device 205 may represent a device utilized by a first user for sending a digital creative element to a second user (e.g., via the second user device 210). The user device 205 may be a personal computer, tablet, cell phone, smart phone, computer, smart television (TV), among other examples, The user device 210 may similarly represent any device utilized by a second user to receive the digital creative element (e.g., a greeting card) sent by the first user (e.g., via the first user device 205). The second user device 210 may be an example of a personal computer, tablet, cell phone, smart phone, computer, smart TV, among other examples. In some examples, the various operations described with reference to the process flow 300 may occur in the same order, or in a different order, than the order described with reference to FIG. 3.

As described herein, a digital creative element may refer to content (e.g., digital content) such as a card, a greeting card, a message, a pre-written, pre-illustrated, or pre-animated image or recording, a message written or recorded by a user, a combination of selectable content and input content (e.g., a selected template, background, text, video, etc., in combination with written or recorded audio or visual content, among other examples), etc. As described herein, a greeting card or card may refer to such a digital creative element.

As described herein, the card connect server may refer to a server that supports selection and delivery of digital creative elements. The card connect server 315 may also be referred to as a server, a communication server, a content server, a connection server, a serve-based system, a server-grade computer, a server-class computer, or a media platform, among other examples. The server (e.g., the card connect server 315) may be, include, or be implemented by, a server-based system. The server may host (e.g., store) sets of data (e.g., media), and may make such data available or accessible to client systems, for example, via one or more communication links (e.g., via a network, a web-based interface, a network interface, wired or wireless communications, or any combination thereof, among other examples). For example, the server may make (e.g., or be coupled with a system that makes) the hosted sets of data accessible to client systems via a smartphone application, via a web browser-based application, via a social media network, via a video-hosting service, etc. The server may support searching for, transmission of, or playing of hosted media by users of client systems (e.g., via a web-based interface provided by or otherwise associated with a media platform or with the server). In some examples, techniques described herein with reference to FIG. 2 or FIG. 3 may be performed using one or more entities (e.g., a host platform, program, server, media platform, client, device, website, or application other than the card connect server 315 may perform the actions of the card connect server 315 as described herein).

The user device 305, the card connect server 315, the host platform 320, and the user device 310 (e.g., among other examples of devices, servers, platforms, programs, etc.) may each be communicatively coupled with a network and thus, via the network, with each other. The network may include any network or communications infrastructure via which the user device 305, the card connect server 315, the host platform 320, and the user device 310 may exchange data. For example, the network may include any aspects of one or more wired networks (e.g., the Internet) or one or more wireless networks (e.g., cellular networks), public networks, or private networks, among other examples. The user device 305, the card connect server 315, the host platform 320, and the user device 310 may each be communicatively coupled with the network via one or more communications links, which may be considered part of the network.

In some examples, as described with reference to FIG. 3, the card connect server 315 may operate in coordination with one or more entities (e.g., vendors, partners, content creators, retailers, etc.) to provide interactive digital creative element use opportunities to users. For example, the user device 305 may be utilized to engage in one or more user behaviors (e.g., may purchase a particular product corresponding to a promotion or activity supported by a first vendor. Such user behavior may provide the first user with an opportunity to opt into a promotional communication scheme (e.g., to select and send digital creative elements to a second user). In some examples, the promotional communication scheme may be based around one or more unique products (e.g., promoted by the vendor), or based around specific times or events (e.g., during an event season or a sporting event), among other examples. In some examples, the vendor and the card connect server 315 may coordinate such that digital creative element selection and sending is provided to users via a host platform 320. The host platform 320 may include a server (e.g., an advertising server 220, as described with reference to FIG. 2), a website, an application, or any combination thereof, among other examples.

The user device 305 may take a user action at 325. For example, the first user may purchase the project (e.g., a beverage sold by the vendor and sponsoring the communication scheme). The physical product purchased (e.g., in person at a vendor location, or online, or via an application supported by the vendor, among other examples) may be packaged to include a digital visual data trigger such examples, the user device 305 may scan the digital visual data trigger, which may provide the user device 305 access to the card connect server 315, the host platform 320, or both. For example, upon scanning the digital visual data trigger, the user device 305 may be provided access to one or more digital creative elements supported by the card connect server 315. The digital creative elements may have specific content related to the vendor or the product, or may include candidate inputs selectable by the user device 305 for a target recipient (e.g., the second user).

In some examples, the user device 305 may take a user action at 325 including an online or application-based purchase of the supported product. Upon making the purchase, at 330, the card connect server 315 may send a user prompt to the user device 305 (e.g., a link, a digital visual data trigger, etc.). For instance, if the user device 305 is a smart TV, a card connect server 315 may display a digital visual data trigger, or if the user device 305 is a smart phone, then the card connect server 315 may provide a link to the host platform 320. In some examples, the host platform 320 may provide the user prompt. The host platform 320 may have access to information regarding the user action performed at 325 (e.g., the host platform 320 may have access to purchase information for the purchase made by the first user, especially as pertaining to the featured product).

In some examples, the user action performed at 325 may include content purchased or viewed by the user device 305. For example, the user device 305 may purchase a pay-per-view event, or may select entertainment for streaming, or may access a live sporting event, among other examples. For example, the user device 305 may select and view a sporting event corresponding to the promotional communication scheme. The user prompt may include a query as to whether the first user would like to select a digital creative element to send to another sports fan (e.g., another individual who may or may not be watching the same sporting event).

At 335, the user device 305 may indicate a selected digital creative element. The digital creative element selection may be indicated to the card connect server 315, directly to the host platform 320, or to the card connect server 315 which may forward the digital creative element selection information to the host platform 320.

At 340, the card connect server 315, the host platform 320, or both, may identify the digital creative element and/or the user action. For example, the first user device 305 may indicate (e.g., at 335) a selected message, or may input individual content in a template provided by the card connect server 315 or the host platform 320. In the case where the user action 325 included viewed content (e.g., a live sporting event), the digital creative element may relate to one or more participating teams or players, including taunts, predictions regarding the outcome of the game, condolences for a pending or past loss, or other content.

In some examples, the user action may provide the host platform 320 with some additional use data. Such data may be directly provided to the host platform 320 or the card connect server 315 (e.g., by the user action, including purchase history among other examples), or may be inferred by the user action (e.g., assumed demographic information based on the selected content viewed via the user device 305).

In some examples, the host platform 320 may generate advertising content at 345. For example, the advertising content may include an offer, a coupon, a discount, or an announcement, for the featured product. For instance, the host platform may generate an advertisement for a vehicle, a beverage, or other products (e.g., based on the demographic information associated with the live sporting event, based on the promotional communication scheme, based on the user action, etc.). In some examples, at 350, the advertising information may be provided to the card connect server 315.

At 355, the card connect server 315 may provide the digital creative element to the user device 310. The card connect server 315 may further provide advertising content to the user device 310. For example, the card connect server 315 may provide a digital visual data trigger or a link within the digital creative element or along with the digital creative element, by which the user device 310 can also access the card connect server 315 or the host platform 320. In some examples, the digital creative element or the advertising content may include a behavior trigger (e.g., indicating that, to participate in the promotional communication scheme, the user device 310 can engage in a user action, which may be the same as or different than the user action 325). For instance, the advertising content may include an invention to purchase the same beverage purchased by the first user at 325, and upon purchasing the beverage, the user device 310 will be able to access the card connect server 315 and/or the host platform 320 to send a return digital creative element to the user device 305. In some examples, the second user may be able to send a responsive comment (e.g., without an additional purchase), but additional advertising content may be included in such a responsive digital creative element. In some examples, the advertising content may be additional advertising content generated based on the digital creative element, user data, etc. (e.g., as described in greater detail with reference to FIG. 2).

Figure 4:
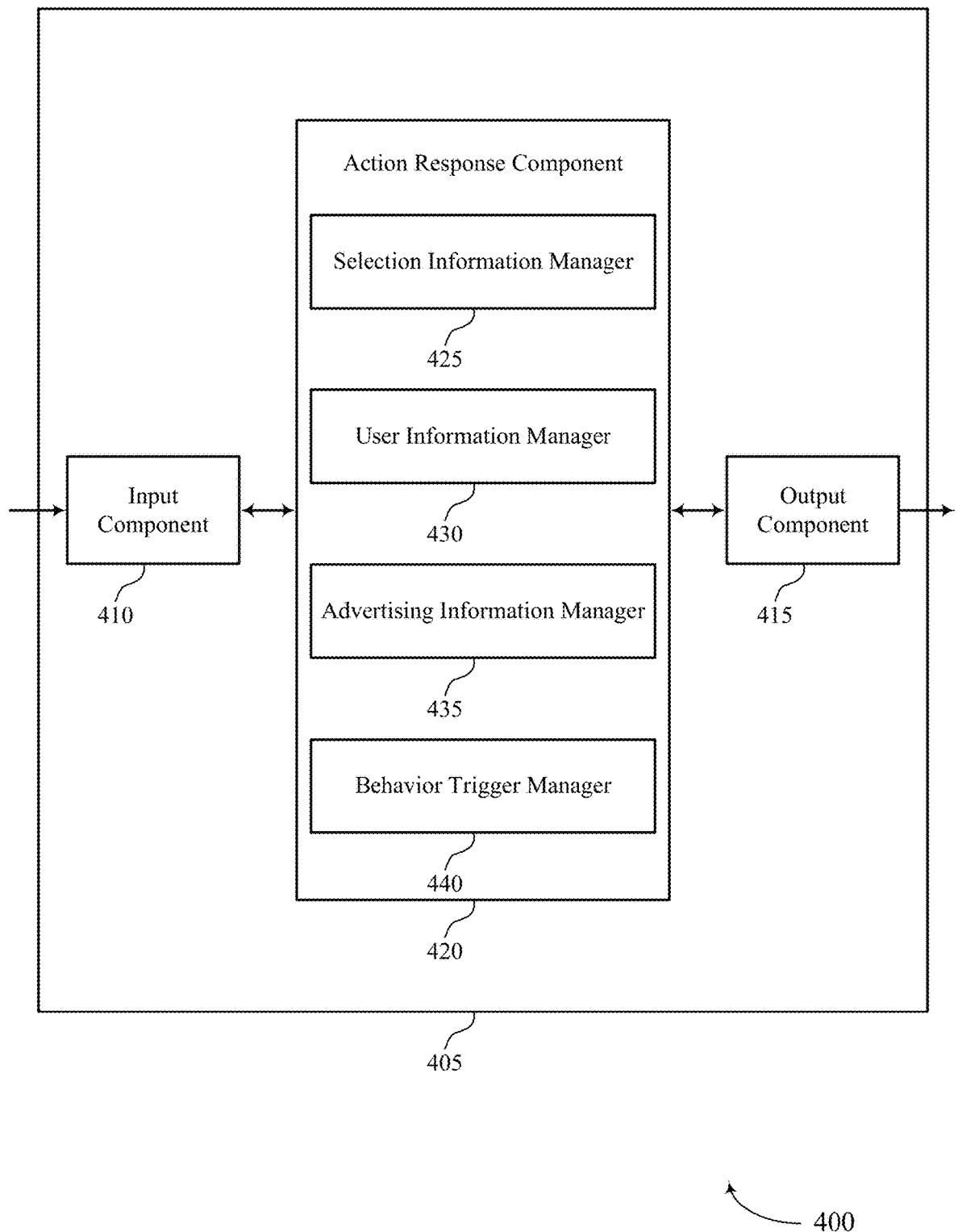
FIG. 4 shows a block diagram of an apparatus that supports digital creative element selection, delivery, and coordinated advertising in accordance with aspects of the present disclosure.

FIG. 4 shows a block diagram 400 of an apparatus (e.g., device) 405 that supports digital creative element selection, delivery, and coordinated advertising in accordance with aspects of the present disclosure. The apparatus 405 may be an example of a server (e.g., the card connect server 215 or the card connect server 315). The apparatus 405 may include an input component 410, an output component 415, and an action response component 420. The apparatus 405, or one of more components of the apparatus 405 (e.g., the input component 410, the output component 415, the action response component 420), may include at least one processor, which may be coupled with at least one memory, to support the described techniques. Each of these components may be in communication with one another (e.g., via one or more buses). The input component 410 may be an example of a network interface, receiver, or a transceiver. The input component 410 may receive (e.g., via a network interface) wireless signaling, wired signaling, or any combination thereof (e.g., from one or more users, from another server, via internet traffic, etc.). The output component 415 may be an example of a network interface, a transmitter, or a transceiver. The output component 415 may output or transmit (e.g., via a network interface) wireless signaling, wired signaling, or any combination thereof (e.g., from one or more users, from another server, via internet traffic, etc.).

The input component 410 may manage input signals for the apparatus 405. For example, the input component 410 may identify input signals based on an interaction with a modem, a keyboard, a mouse, a touchscreen, or a similar device. These input signals may be associated with user input or processing at other components or devices. In some cases, the input component 410 may utilize an operating system such as iOS®, ANDROID®, MS-DOS®, MS-WINDOWS®, OS/2®, UNIX®, LINUX®, or another known operating system to handle input signals. The input component 410 may send aspects of these input signals to other components of the apparatus 405 for processing. For example, the input component 410 may transmit input signals to the action response component 420 to support digital creative element selection, delivery, and coordinated advertising. In some cases, the input component 410 may be a component of an I/O controller 610 as described with reference to FIG. 6.

The output component 415 may manage output signals for the apparatus 405. For example, the output component 415 may receive signals from other components of the apparatus 405, such as the action response component 420, and may transmit these signals to other components or devices. In some specific examples, the output component 415 may transmit output signals for display in a user interface, for storage in a database or data store, for further processing at a server or server cluster, or for any other processes at any number of devices or systems. In some cases, the output component 415 may be a component of an I/O controller 610 as described with reference to FIG. 6.

For example, the action response component 420 may include a selection information manager 425, a user information manager 430, an advertising information manager 435, a behavior trigger manager 440, or any combination thereof. In some examples, the action response component 420, or various components thereof, may be configured to perform various operations (e.g., receiving, monitoring, transmitting) using or otherwise in cooperation with the input component 410, the output component 415, or both. For example, the action response component 420 may receive information from the input component 410, send information to the output component 415, or be integrated in combination with the input component 410, the output component 415, or both to receive information, transmit information, or perform various other operations as described herein.

The selection information manager 425 may be configured as or otherwise support a means for receiving, by a first server from a first user device, digital creative element selection information indicating a first digital creative element of a plurality of digital creative elements, the first digital creative element being a first digital greeting card for delivery to a second user device. The user information manager 430 may be configured as or otherwise support a means for obtaining, by the first server, user data corresponding to a first user associated with the first user device, a second user associated with the second user device, or both. The user information manager 430 may be configured as or otherwise support a means for transmitting, by the first server, the digital creative element selection information and the user data to a second server. The advertising information manager 435 may be configured as or otherwise support a means for receiving, by the first server from the second server, an indication of advertising information for the first user, the second user, or both, the advertising information based at least in part on the digital creative element selection information and the user data. The behavior trigger manager 440 may be configured as or otherwise support a means for transmitting, by the first server to the second user device, the first digital greeting card and a first behavior trigger for the second user, the first behavior trigger based at least in part on the advertising information.

Figure 5:
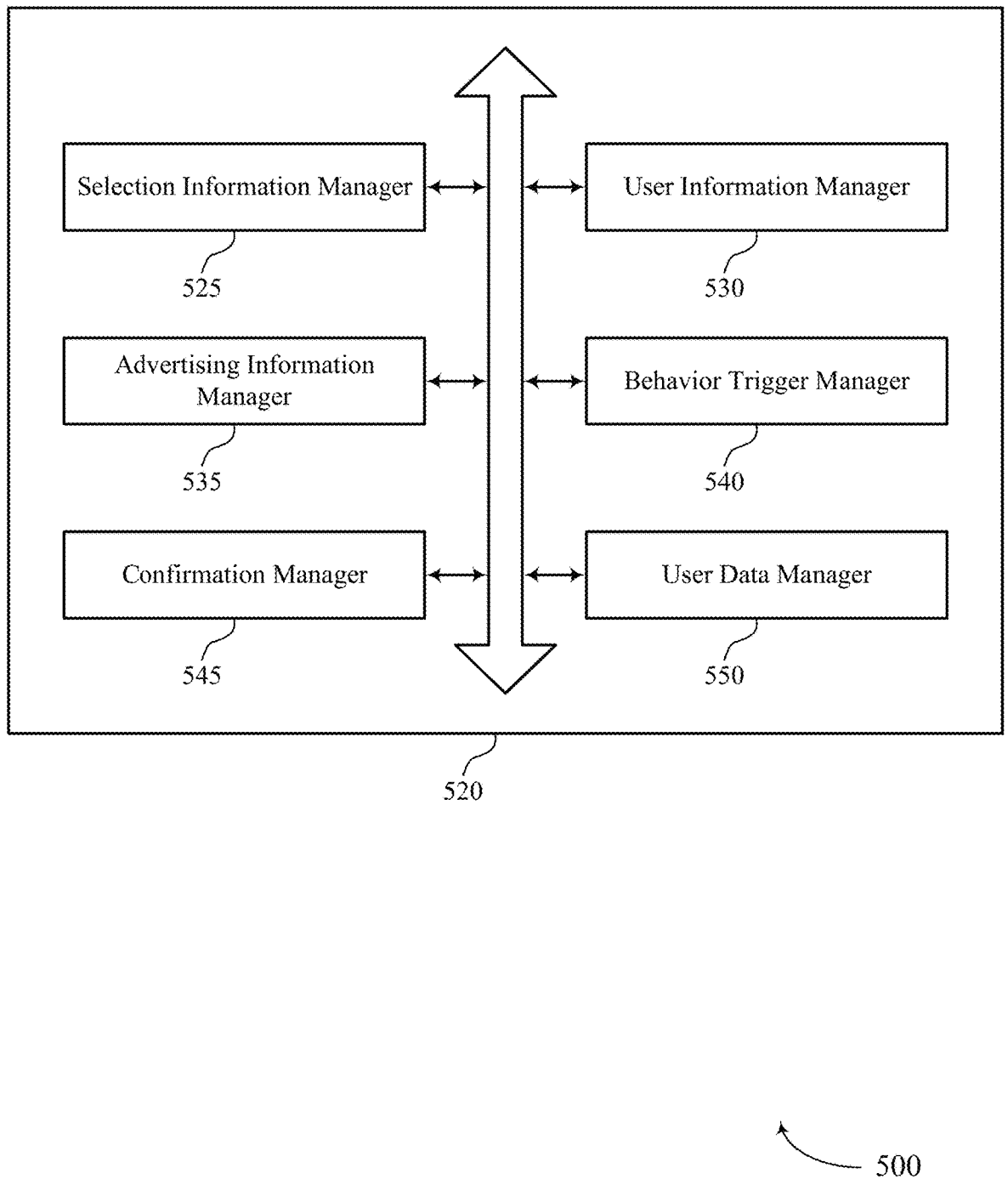
FIG. 5 shows a block diagram of an action response component that supports digital creative element selection, delivery, and coordinated advertising in accordance with aspects of the present disclosure.

FIG. 5 shows a block diagram 500 of an action response component 520 that supports digital creative element selection, delivery, and coordinated advertising in accordance with aspects of the present disclosure. The action response component 520 may be an example of aspects of an action response component or an action response component 420, as described herein. The action response component 520, or various components thereof, may be an example of means for performing various aspects of digital creative element selection, delivery, and coordinated advertising as described herein. For example, the action response component 520 may include a selection information manager 525, a user information manager 530, an advertising information manager 535, a behavior trigger manager 540, a confirmation manager 545, a user data manager 550, or any combination thereof. Each of these components, or components of sub- components thereof (e.g., one or more processors, one or more memories), may communicate, directly or indirectly, with one another (e.g., via one or more buses).

The selection information manager 525 may be configured as or otherwise support a means for receiving, by a first server from a first user device, digital creative element selection information indicating a first digital creative element of a plurality of digital creative elements, the first digital creative element being a first digital greeting card for delivery to a second user device. The user information manager 530 may be configured as or otherwise support a means for obtaining, by the first server, user data corresponding to a first user associated with the first user device, a second user associated with the second user device, or both. In some examples, the user information manager 530 may be configured as or otherwise support a means for transmitting, by the first server, the digital creative element selection information and the user data to a second server. The advertising information manager 535 may be configured as or otherwise support a means for receiving, by the first server from the second server, an indication of advertising information for the first user, the second user, or both, the advertising information based at least in part on the digital creative element selection information and the user data. The behavior trigger manager 540 may be configured as or otherwise support a means for transmitting, by the first server to the second user device, the first digital greeting card and a first behavior trigger for the second user, the first behavior trigger based at least in part on the advertising information.

In some examples, the behavior trigger manager 540 may be configured as or otherwise support a means for transmitting, by the first server to the first user device, a second behavior trigger for the first user based at least in part on the advertising information.

In some examples, the confirmation manager 545 may be configured as or otherwise support a means for receiving, by the first server from the second user device, a confirmation message indicating successful receipt by the second user device of the first digital greeting card and the first behavior trigger.

In some examples, the confirmation manager 545 may be configured as or otherwise support a means for forwarding, by the first server to the first user device, the confirmation message.

In some examples, the user data comprises user preferences corresponding to one or more applications supported by the first user device, product preference information corresponding to the one or more applications, purchasing history via the one or more applications, or any combination thereof.

In some examples, obtaining the user data comprising the user preferences, the product preference information, the purchasing history, or any combination thereof is based at least in part on an authorization for the first server associated with the one or more applications supported by the first user device.

In some examples, to support obtaining the user data, the user data manager 550 may be configured as or otherwise support a means for obtaining cookies from one or more websites, keystroke information input via the first user device, demographic inferences corresponding to the first digital greeting card, one or more current conditions associated with selection of the first digital greeting card, or any combination thereof.

In some examples, the first behavior trigger, a second behavior trigger for the first user, or both comprise a coupon, an offer for purchase, a temporary discount, an announcement of a product, or any combination thereof.

In some examples, the first behavior trigger comprises a selectable link embedded in the first digital greeting card or a digital visual data trigger that is configured to provide access to the advertising information by the second user device or by a third user device based at least in part on the first digital greeting card being transmitted to the second user device.

In some examples, a first message includes both the first digital greeting card and the first behavior trigger.

In some examples, a first message includes the first digital greeting card and a second message includes the first behavior trigger.

In some examples, the user data corresponding to the second user comprises one or more conditions corresponding to the first digital greeting card, a device identifier corresponding to the second user device, contents of the first digital greeting card, demographic information corresponding to the first digital greeting card, registration information corresponding to an application or operating system at the second user device, or any combination thereof.

Figure 6:
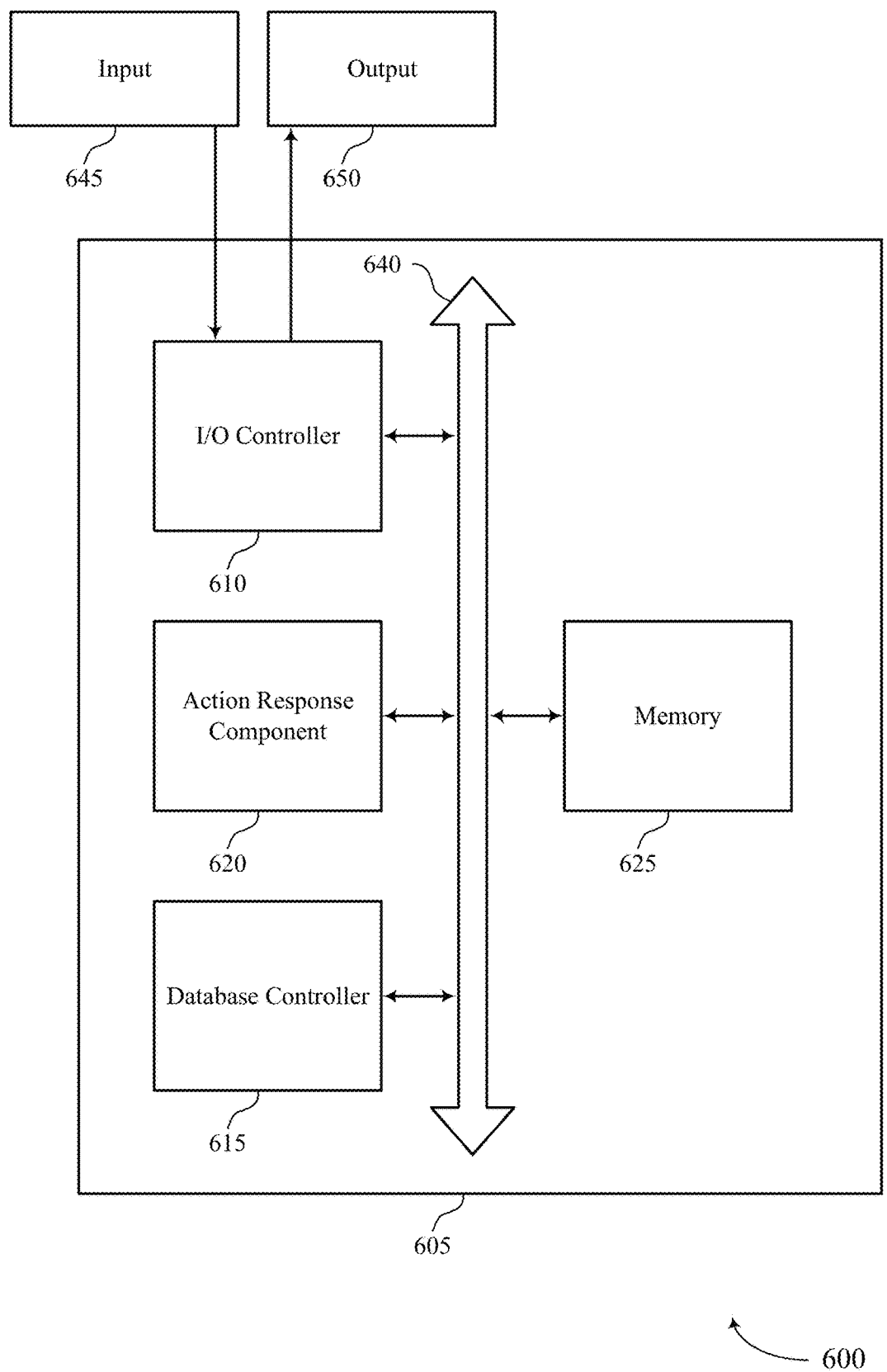
FIG. 6 shows a diagram of a system including a device that supports digital creative element selection, delivery, and coordinated advertising in accordance with aspects of the present disclosure.

FIG. 6 shows a diagram of a system 600 including a device 605 that supports digital creative element selection, delivery, and coordinated advertising in accordance with aspects of the present disclosure. The device 605 may be an example of or include components of an apparatus 405 as described herein. The device 605 may include components for bi-directional voice and data communications including components for transmitting and receiving communications, such as an action response component 620, an I/O controller, such as an I/O controller 610, a database controller 615, at least one memory 625, at least one processor 630, and a database 635. These components may be in electronic communication or otherwise coupled (e.g., operatively, communicatively, functionally, electronically, electrically) via one or more buses (e.g., a bus 640). The input component 645 may be an example of a network interface, receiver, or a transceiver. The input component 645 may receive (e.g., via a network interface) wireless signaling, wired signaling, or any combination thereof (e.g., from one or more users, from another server, via internet traffic, etc.). The output component 650 may be an example of a network interface, a transmitter, or a transceiver. The output component 650 may output or transmit (e.g., via a network interface) wireless signaling, wired signaling, or any combination thereof (e.g., from one or more users, from another server, via internet traffic, etc.).

The I/O controller 610 may manage, for the device 605, input signals received via the input component 645 and output signals for outputting via the output component 650. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally or alternatively, the I/O controller 610 may represent or interact with a modem, a keyboard, a mouse, a touchscreen, or a similar device. In some cases, the I/O controller 610 may be implemented as part of a processor. In some examples, a user may interact with the device 605 via the I/O controller 610 or via hardware components controlled by the I/O controller 610.

The database controller 615 may manage data storage and processing in a database 635. The database 635 may be external to the device 605, temporarily or permanently connected to the device 605, or a data storage component of the device 605. In some cases, a user may interact with the database controller 615. In some other cases, the database controller 615 may operate automatically without user interaction. The database 635 may be an example of a persistent data store, a single database, a distributed database, multiple distributed databases, a database management system, or an emergency backup database.

Memory 625 may include random-access memory (RAM) and ROM. The memory 625 may store computer-readable, computer-executable software including instructions that, when executed, cause the processor to perform various functions described herein. In some cases, the memory 625 may contain, among other things, a BIOS which may control basic hardware or software operation such as the interaction with peripheral components or devices.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In some other cases, a memory controller may be integrated into the processor 630. The processor 630 may be configured to execute computer-readable instructions stored in memory 625 to perform various functions (e.g., functions or tasks supporting digital creative element selection, delivery, and coordinated advertising).

For example, the action response component 620 may be configured as or otherwise support a means for receiving, by a first server from a first user device, digital creative element selection information indicating a first digital creative element of a plurality of digital creative elements, the first digital creative element being a first digital greeting card for delivery to a second user device. The action response component 620 may be configured as or otherwise support a means for obtaining, by the first server, user data corresponding to a first user associated with the first user device, a second user associated with the second user device, or both. The action response component 620 may be configured as or otherwise support a means for transmitting, by the first server, the digital creative element selection information and the user data to a second server. The action response component 620 may be configured as or otherwise support a means for receiving, by the first server from the second server, an indication of advertising information for the first user, the second user, or both, the advertising information based at least in part on the digital creative element selection information and the user data. The action response component 620 may be configured as or otherwise support a means for transmitting, by the first server to the second user device, the first digital greeting card and a first behavior trigger for the second user, the first behavior trigger based at least in part on the advertising information.

By including or configuring the action response component 620 in accordance with examples as described herein, the device 605 may support techniques for digital content delivery, and advertising resulting in effective delivery of behavioral triggers, more efficient use of available space for vendors, more convenient delivery of digital content between or for users, more focused or applicable advertising for users, more efficient use of available user information, improved user security and privacy protection, and improved user experience.

Figure 7:
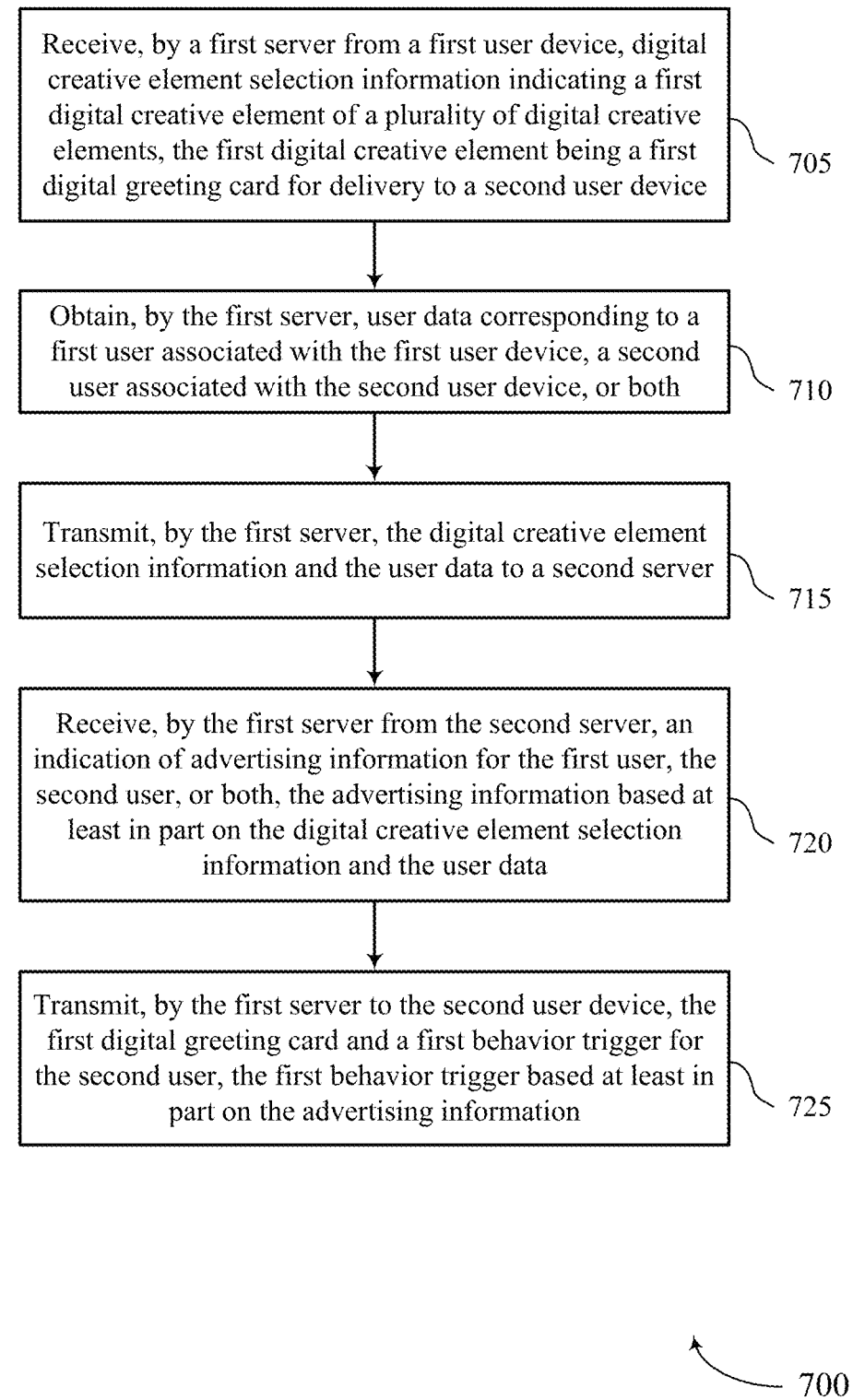
FIGS. 7 through 9 show flowcharts illustrating methods that support digital creative element selection, delivery, and coordinated advertising in accordance with aspects of the present disclosure.

FIG. 7 shows a flowchart illustrating a method 700 that supports digital creative element selection, delivery, and coordinated advertising in accordance with aspects of the present disclosure. The operations of the method 700 may be implemented by a Generic Device or its components as described herein. For example, the operations of the method 700 may be performed by a Generic Device as described with reference to FIGS. 1 through 6. In some examples, a Generic Device may execute a set of instructions to control the functional elements of the Generic Device to perform the described functions. Additionally, or alternatively, the Generic Device may perform aspects of the described functions using special-purpose hardware.

At 705, the method may include receiving, by a first server from a first user device, digital creative element selection information indicating a first digital creative element of a plurality of digital creative elements, the first digital creative element being a first digital greeting card for delivery to a second user device. The operations of 705 may be performed in accordance with examples as disclosed herein. In some examples, aspects of the operations of 705 may be performed by a selection information manager 525 as described with reference to FIG. 5.

At 710, the method may include obtaining, by the first server, user data corresponding to a first user device associated with the first user device, a second user associated with the second user device, or both. The operations of 710 may be performed in accordance with examples as disclosed herein. In some examples, aspects of the operations of 710 may be performed by a user information manager 530 as described with reference to FIG. 5.

At 715, the method may include transmitting, by the first server, the digital creative element selection information and the user data to a second server. The operations of 715 may be performed in accordance with examples as disclosed herein. In some examples, aspects of the operations of 715 may be performed by a user information manager 530 as described with reference to FIG. 5.

At 720, the method may include receiving, by the first server from the second server, an indication of advertising information for the first user, the second user, or both, the advertising information based at least in part on the digital creative element selection information and the user data. The operations of 720 may be performed in accordance with examples as disclosed herein. In some examples, aspects of the operations of 720 may be performed by an advertising information manager 535 as described with reference to FIG. 5.

At 725, the method may include transmitting, by the first server to the second user device, the first digital greeting card and a first behavior trigger for the second user, the first behavior trigger based at least in part on the advertising information. The operations of 725 may be performed in accordance with examples as disclosed herein. In some examples, aspects of the operations of 725 may be performed by a behavior trigger manager 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor) for receiving, by a first server from a first user device, digital creative element selection information indicating a first digital creative element of a plurality of digital creative elements, the first digital creative element being a first digital greeting card for delivery to a second user device, obtaining, by the first server, user data corresponding to a first user associated with the first user device, a second user associated with the second user device, or both, transmitting, by the first server, the digital creative element selection information and the user data to a second server, receiving, by the first server from the second server, an indication of advertising information for the first user, the second user, or both, the advertising information based at least in part on the digital creative element selection information and the user data, and transmitting, by the first server to the second user device, the first digital greeting card and a first behavior trigger for the second user, the first behavior trigger based at least in part on the advertising information.

Some examples of the method 700 and the apparatus described herein may further include operations, features, means, or instructions for transmitting, by the first server to the first user device, a second behavior trigger for the first user based at least in part on the advertising information.

Some examples of the method 700 and the apparatus described herein may further include operations, features, means, or instructions for receiving, by the first server from the second user device, a confirmation message indicating successful receipt by the second user device of the first digital greeting card and the first behavior trigger.

In some examples of the method 700 and the apparatus described herein, forwarding, by the first server to the first user device, the confirmation message.

In some examples of the method 700 and the apparatus described herein, the user data comprises user preferences corresponding to one or more applications supported by the first user device, product preference information corresponding to the one or more applications, purchasing history via the one or more applications, or any combination thereof.

Some examples of the method 700 and the apparatus described herein may further include operations, features, means, or instructions for obtaining the user data comprising the user preferences, the product preference information, the purchasing history, or any combination thereof may be based at least in part on an authorization for the first server associated with the one or more applications supported by the first user device.

In some examples of the method 700 and the apparatus described herein, obtaining the user data may include operations, features, circuitry, logic, means, or instructions for obtaining cookies from one or more websites, keystroke information input via the first user device, demographic inferences corresponding to the first digital greeting card, one or more current conditions associated with selection of the first digital greeting card, or any combination thereof.

In some examples of the method 700 and the apparatus described herein, the first behavior trigger, a second behavior trigger for the first user, or both comprise a coupon, an offer for purchase, a temporary discount, an announcement of a product, or any combination thereof.

In some examples of the method 700 and the apparatus described herein, the first behavior trigger comprises a selectable link embedded in the first digital greeting card or a digital visual data trigger that may be configured to provide access to the advertising information by the second user device or by a third user device based at least in part on the first digital greeting card being transmitted to the second user device.

In some examples of the method 700 and the apparatus described herein, a first message includes both the first digital greeting card and the first behavior trigger.

In some examples of the method 700 and the apparatus described herein, a first message includes the first digital greeting card and a second message includes the first behavior trigger.

In some examples of the method 700 and the apparatus described herein, the user data corresponding to the second user comprises one or more conditions corresponding to the first digital greeting card, a device identifier corresponding to the second user device, contents of the first digital greeting card, demographic information corresponding to the first digital greeting card, registration information corresponding to an application or operating system at the second user device, or any combination thereof.

Figure 8:
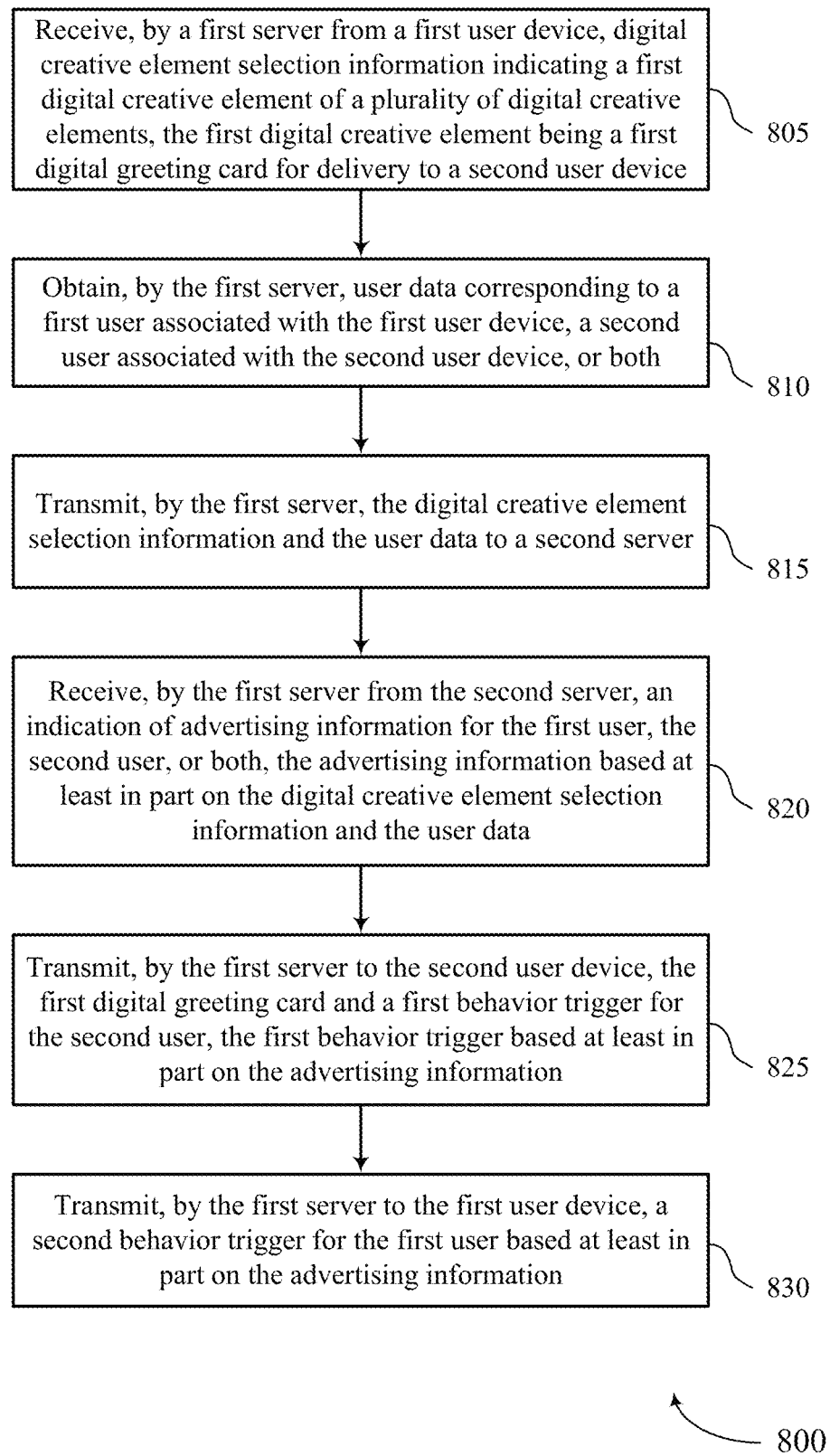

FIG. 8 shows a flowchart illustrating a method 800 that supports digital creative element selection, delivery, and coordinated advertising in accordance with aspects of the present disclosure. The operations of the method 800 may be implemented by a Generic Device or its components as described herein. For example, the operations of the method 800 may be performed by a Generic Device as described with reference to FIGS. 1 through 6. In some examples, a Generic Device may execute a set of instructions to control the functional elements of the Generic Device to perform the described functions. Additionally, or alternatively, the Generic Device may perform aspects of the described functions using special-purpose hardware.

At 805, the method may include receiving, by a first server from a first user device, digital creative element selection information indicating a first digital creative element of a plurality of digital creative elements, the first digital creative element being a first digital greeting card for delivery to a second user device. The operations of 805 may be performed in accordance with examples as disclosed herein. In some examples, aspects of the operations of 805 may be performed by a selection information manager 525 as described with reference to FIG. 5.

At 810, the method may include obtaining, by the first server, user data corresponding to a first user associated with the first user device, a second user associated with the second user device, or both. The operations of 810 may be performed in accordance with examples as disclosed herein. In some examples, aspects of the operations of 810 may be performed by a user information manager 530 as described with reference to FIG. 5.

At 815, the method may include transmitting, by the first server, the digital creative element selection information and the user data to a second server. The operations of 815 may be performed in accordance with examples as disclosed herein. In some examples, aspects of the operations of 815 may be performed by a user information manager 530 as described with reference to FIG. 5.

At 820, the method may include receiving, by the first server from the second server, an indication of advertising information for the first user, the second user, or both, the advertising information based at least in part on the digital creative element selection information and the user data. The operations of 820 may be performed in accordance with examples as disclosed herein. In some examples, aspects of the operations of 820 may be performed by an advertising information manager 535 as described with reference to FIG. 5.

At 825, the method may include transmitting, by the first server to the second user device, the first digital greeting card and a first behavior trigger for the second user, the first behavior trigger based at least in part on the advertising information. The operations of 825 may be performed in accordance with examples as disclosed herein. In some examples, aspects of the operations of 825 may be performed by a behavior trigger manager 540 as described with reference to FIG. 5.

At 830, the method may include transmitting, by the first server to the first user device, a second behavior trigger for the first user based at least in part on the advertising information. The operations of 830 may be performed in accordance with examples as disclosed herein. In some examples, aspects of the operations of 830 may be performed by a behavior trigger manager 540 as described with reference to FIG. 5.

Figure 9:
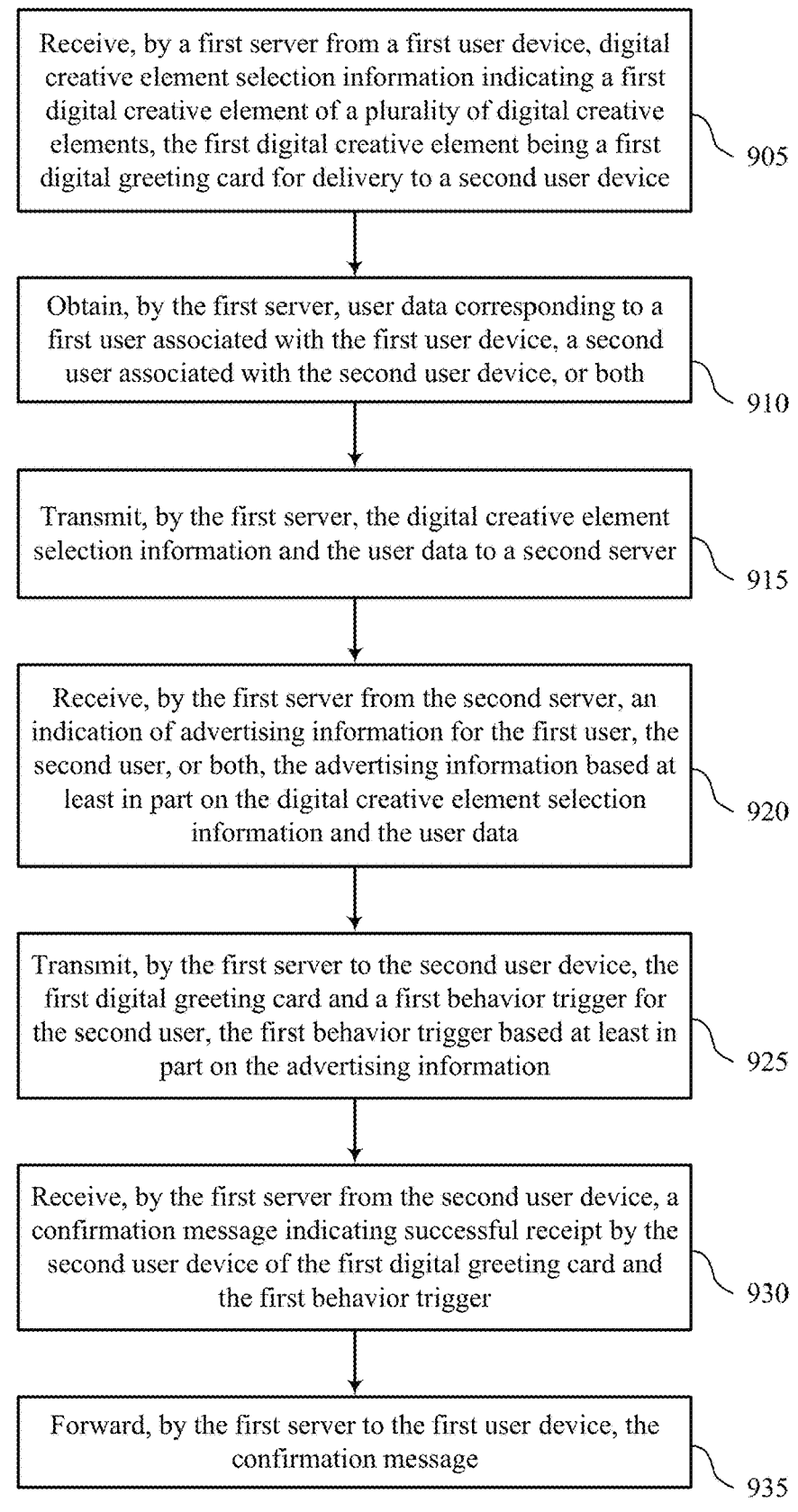

FIG. 9 shows a flowchart illustrating a method 900 that supports digital creative element selection, delivery, and coordinated advertising in accordance with aspects of the present disclosure. The operations of the method 900 may be implemented by a Generic Device or its components as described herein. For example, the operations of the method 900 may be performed by a Generic Device as described with reference to FIGS. 1 through 6. In some examples, a Generic Device may execute a set of instructions to control the functional elements of the Generic Device to perform the described functions. Additionally, or alternatively, the Generic Device may perform aspects of the described functions using special-purpose hardware.

At 905, the method may include receiving, by a first server from a first user device, digital creative element selection information indicating a first digital creative element of a plurality of digital creative elements, the first digital creative element being a first digital greeting card for delivery to a second user device. The operations of 905 may be performed in accordance with examples as disclosed herein. In some examples, aspects of the operations of 905 may be performed by a selection information manager 525 as described with reference to FIG. 5.

At 910, the method may include obtaining, by the first server, user data corresponding to a first user associated with the first user device, a second user associated with the second user device, or both. The operations of 910 may be performed in accordance with examples as disclosed herein. In some examples, aspects of the operations of 910 may be performed by a user information manager 530 as described with reference to FIG. 5.

At 915, the method may include transmitting, by the first server, the digital creative element selection information and the user data to a second server. The operations of 915 may be performed in accordance with examples as disclosed herein. In some examples, aspects of the operations of 915 may be performed by a user information manager 530 as described with reference to FIG. 5.

At 920, the method may include receiving, by the first server from the second server, an indication of advertising information for the first user, the second user, or both, the advertising information based at least in part on the digital creative element selection information and the user data. The operations of 920 may be performed in accordance with examples as disclosed herein. In some examples, aspects of the operations of 920 may be performed by an advertising information manager 535 as described with reference to FIG. 5.

At 925, the method may include transmitting, by the first server to the second user device, the first digital greeting card and a first behavior trigger for the second user, the first behavior trigger based at least in part on the advertising information. The operations of 925 may be performed in accordance with examples as disclosed herein. In some examples, aspects of the operations of 925 may be performed by a behavior trigger manager 540 as described with reference to FIG. 5.

At 930, the method may include receiving, by the first server from the second user device, a confirmation message indicating successful receipt by the second user device of the first digital greeting card and the first behavior trigger. The operations of 930 may be performed in accordance with examples as disclosed herein. In some examples, aspects of the operations of 930 may be performed by a confirmation manager 545 as described with reference to FIG. 5.

At 935, the method may include forwarding, by the first server to the first user device, the confirmation message. The operations of 935 may be performed in accordance with examples as disclosed herein. In some examples, aspects of the operations of 935 may be performed by a confirmation manager 545 as described with reference to FIG. 5.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The following provides an overview of aspects of the present disclosure:

Aspect 1: A method, comprising: receiving, by a first server from a first user device, digital creative element selection information indicating a first digital creative element of a plurality of digital creative elements, the first digital creative element comprising a first digital greeting card for delivery to a second user device; obtaining, by the first server, user data corresponding to a first user associated with the first user device, a second user associated with the second user device, or both; transmitting, by the first server, the digital creative element selection information and the user data to a second server; receiving, by the first server from the second server, an indication of advertising information for the first user, the second user, or both, the advertising information based at least in part on the digital creative element selection information and the user data; and transmitting, by the first server to the second user device, the first digital greeting card and a first behavior trigger for the second user, the first behavior trigger based at least in part on the advertising information.

Aspect 2: The method of aspect 1, further comprising: transmitting, by the first server to the first user device, a second behavior trigger for the first user based at least in part on the advertising information.

Aspect 3: The method of any of aspects 1 through 2, further comprising: receiving, by the first server from the second user device, a confirmation message indicating successful receipt by the second user device of the first digital greeting card and the first behavior trigger.

Aspect 4: The method of aspect 3, further comprising: forwarding, by the first server to the first user device, the confirmation message.

Aspect 5: The method of any of aspects 1 through 4, wherein the user data comprises user preferences corresponding to one or more applications supported by the first user device, product preference information corresponding to the one or more applications, purchasing history via the one or more applications, or any combination thereof.

Aspect 6: The method of aspect 5, wherein obtaining the user data comprising the user preferences, the product preference information, the purchasing history, or any combination thereof is based at least in part on an authorization for the first server associated with the one or more applications supported by the first user device.

Aspect 7: The method of any of aspects 1 through 6, wherein obtaining the user data comprises: obtaining cookies from one or more websites, keystroke information input via the first user device, demographic inferences corresponding to the first digital greeting card, one or more current conditions associated with selection of the first digital greeting card, or any combination thereof.

Aspect 8: The method of any of aspects 1 through 7, wherein the first behavior trigger, a second behavior trigger for the first user, or both comprise a coupon, an offer for purchase, a temporary discount, an announcement of a product, or any combination thereof.

Aspect 9: The method of any of aspects 1 through 8, wherein the first behavior trigger comprises a selectable link embedded in the first digital greeting card or a digital visual data trigger that is configured to provide access to the advertising information by the second user device or by a third user device based at least in part on the first digital greeting card being transmitted to the second user device.

Aspect 10: The method of any of aspects 1 through 9, wherein a first message includes both the first digital greeting card and the first behavior trigger.

Aspect 11: The method of any of aspects 1 through 10, wherein a first message includes the first digital greeting card and a second message includes the first behavior trigger.

Aspect 12: The method of any of aspects 1 through 11, wherein the user data corresponding to the second user comprises one or more conditions corresponding to the first digital greeting card, a device identifier corresponding to the second user device, contents of the first digital greeting card, demographic information corresponding to the first digital greeting card, registration information corresponding to an application or operating system at the second user device, or any combination thereof.

Aspect 13: An apparatus comprising one or more memories storing processor-executable code, and one or more processors coupled with the one or more memories and individually or collectively operable to execute the code to cause the apparatus to perform a method of any of aspects 1 through 12.

Aspect 14: An apparatus comprising at least one means for performing a method of any of aspects 1 through 12.

Aspect 15: A non-transitory computer-readable medium storing code the code comprising instructions executable by one or more processors to perform a method of any of aspects 1 through 12.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, by a first server from a first user device via an application corresponding to the first server, digital creative element selection information indicating a first digital creative element of a plurality of digital creative elements, the first digital creative element comprising a first digital greeting card for delivery to a second user device;
   obtaining, by the first server in accordance with user authorization via the application corresponding to the first server, first user data corresponding to a first user associated with the first user device, second user data corresponding to a second user associated with the second user device, or both, wherein:
   the first user data comprises user preferences corresponding to one or more applications supported by the first user device, product preference information corresponding to the one or more applications, purchasing history for the first user and corresponding to the one or more applications, cookie information corresponding to the one or more applications, keystroke information input via the first user device, demographic inferences corresponding to the first digital greeting card, one or more current conditions associated with selection of the first digital greeting card, or any combination thereof, and
   the second user data comprises one or more conditions corresponding to the first digital greeting card, a device identifier corresponding to the second user device, contents of the first digital greeting card, demographic information corresponding to the first digital greeting card, registration information corresponding to an application or operating system at the second user device, or any combination thereof;

transmitting, by the first server via the application corresponding to the first server, the digital creative element selection information and the first user data, the second user data, or both to a second server;

receiving, by the first server from the second server via a network interface, an indication of advertising information for the first user, the second user, or both, the advertising information based at least in part on the digital creative element selection information and the first user data, the second user data, or both;

identifying, by the first server via the application corresponding to the first server, relevant advertising content for the first user, the second user, or both, from the advertising information based at least in part on the digital creative element selection information, the first user data, the second user data, or any combination thereof;

autonomously generating, by the first server, a first behavior trigger for the second user, the first behavior trigger in accordance with the relevant advertising content, the second user data, and the first digital greeting card, wherein the first behavior trigger for the second user comprises an offer, a coupon, an announcement, a banner, an electronic link, a visual code, a visual input, a digital prompt, or any combination thereof;

embedding, by the first server via the application corresponding to the first server, the first behavior trigger and the first digital greeting card into a network message; and transmitting, by the first server to the second user device via the application corresponding to the first server, the network message comprising the first digital greeting card and the first behavior trigger for the second user.

2. The method of claim 1, further comprising:
transmitting, by the first server to the first user device, a second behavior trigger for the first user based at least in part on the advertising information.

3. The method of claim 1, further comprising:
receiving, by the first server from the second user device, a confirmation message indicating successful receipt by the second user device of the first digital greeting card and the first behavior trigger.

4. The method of claim 3, further comprising:
forwarding, by the first server to the first user device, the confirmation message.

5. The method of claim 1, wherein the first behavior a second behavior trigger for the first user comprises the coupon or a second coupon, the offer or a second offer for purchase, a temporary discount, the announcement or a second announcement of a product, or any combination thereof.

6. The method of claim 1, wherein the first behavior trigger comprises a selectable link embedded in the first digital greeting card or a digital visual data trigger that is configured to provide access to the advertising information by the second user device or by a third user device based at least in part on the first digital greeting card being transmitted to the second user device.

7. The method of claim 1, wherein a first message includes both the first digital greeting card and the first behavior trigger.

8. The method of claim 1, wherein a first message includes the first digital greeting card and a second message includes the first behavior trigger.

9. An apparatus, comprising:
one or more memories storing processor-executable code; and
one or more processors coupled with the one or more memories and individually or collectively operable to execute the code to cause the apparatus to:
receive, by a first server from a first user device via an application corresponding to the first server, digital creative element selection information indicating a first digital creative element of a plurality of digital creative elements, the first digital creative element comprising a first digital greeting card for delivery to a second user device;

obtain, by the first server in accordance with user authorization via the application corresponding to the first server, first user data corresponding to a first user associated with the first user device, second user data corresponding to a second user associated with the second user device, or both, wherein:
the first user data comprises user preferences corresponding to one or more applications supported by the first user device, product preference information corresponding to the one or more applications, purchasing history for the first user and corresponding to the one or more applications, cookie information corresponding to the one or more applications, keystroke information input via the first user device, demographic inferences corresponding to the first digital greeting card, one or more current conditions associated with selection of the first digital greeting card, or any combination thereof, and
the second user data comprises one or more conditions corresponding to the first digital greeting card, a device identifier corresponding to the second user device, contents of the first digital greeting card, demographic information corresponding to the first digital greeting card, registration information corresponding to an application or operating system at the second user device, or any combination thereof;

transmit, by the first server via the application corresponding to the first server, the digital creative element selection information and the first user data, the second user data, or both to a second server;

receive, by the first server from the second server via a network interface, an indication of advertising information for the first user, the second user, or both, the advertising information based at least in part on the digital creative element selection information and the first user data, the second user data, or both;

identify, by the first server via the application corresponding to the first server, relevant advertising content for the first user, the second user, or both, from the advertising information based at least in part on the digital creative element selection information, the first user data, the second user data, or any combination thereof;

autonomously generate, by the first server, a first behavior trigger for the second user, the first behavior trigger in accordance with the relevant advertising content, the second user data, and the first digital greeting card, wherein the first behavior trigger for the second user comprises an offer, a coupon, an announcement, a banner, an electronic link, a visual code, a visual input, a digital prompt, or any combination thereof;

embed, by the first server via the application corresponding to the first server, the first behavior trigger and the first digital greeting card into a network message; and transmit, by the first server to the second user device via the application corresponding to the first server, the network message comprising the first digital greeting card and the first behavior trigger for the second user.

10. The apparatus of claim 9, wherein the one or more processors are individually or collectively further operable to execute the code to cause the apparatus to:

transmit, by the first server to the first user device, a second behavior trigger for the first user based at least in part on the advertising information.

11. The apparatus of claim 9, wherein the one or more processors are individually or collectively further operable to execute the code to cause the apparatus to:

receive, by the first server from the second user device, a confirmation message indicating successful receipt by the second user device of the first digital greeting card and the first behavior trigger.

12. The apparatus of claim 11, wherein the one or more processors are individually or collectively further operable to execute the code to cause the apparatus to:

forward, by the first server to the first user device, the confirmation message.

13. A non-transitory computer-readable medium storing code, the code comprising instructions executable by one or more processors to:

receive, by a first server from a first user device via an application corresponding to the first server, digital creative element selection information indicating a first digital creative element of a plurality of digital creative elements, the first digital creative element comprising a first digital greeting card for delivery to a second user device;

obtain, by the first server in accordance with user authorization via the application corresponding to the first server, first user data corresponding to a first user associated with the first user device, second user data corresponding to a second user associated with the second user device, or both, wherein:

the first user data comprises user preferences corresponding to one or more applications supported by the first user device, product preference information corresponding to the one or more applications, purchasing history for the first user and corresponding to the one or more applications, cookie information corresponding to the one or more applications, keystroke information input via the first user device, demographic inferences corresponding to the first digital greeting card, one or more current conditions associated with selection of the first digital greeting card, or any combination thereof, and the second user data comprises one or more conditions corresponding to the first digital greeting card, a device identifier corresponding to the second user device, contents of the first digital greeting card, demographic information corresponding to the first digital greeting card, registration information corresponding to an application or operating system at the second user device, or any combination thereof;

transmit, by the first server via the application corresponding to the first server, the digital creative element selection information and the first user data, the second user data, or both to a second server;

receive, by the first server from the second server via a network interface, an indication of advertising information for the first user, the second user, or both, the advertising information based at least in part on the digital creative element selection information and the first user data, the second user data, or both;

identify, by the first server via the application corresponding to the first server, relevant advertising content for the first user, the second user, or both, from the advertising information based at least in part on the digital creative element selection information, the first user data, the second user data, or any combination thereof;

autonomously generate, by the first server, a first behavior trigger for the second user, the first behavior trigger in accordance with the relevant advertising content, the second user data, and the first digital greeting card, wherein the first behavior trigger for the second user comprises an offer, a coupon, an announcement, a banner, an electronic link, a visual code, a visual input, a digital prompt, or any combination thereof;

embed, by the first server via the application corresponding to the first server, the first behavior trigger and the first digital greeting card into a network message; and transmit, by the first server to the second user device via the application corresponding to the first server, the network message comprising the first digital greeting card and the first behavior trigger for the second user.

* * * * *